US010417289B2

(12) United States Patent
Imbruce et al.

(10) Patent No.: US 10,417,289 B2
(45) Date of Patent: Sep. 17, 2019

(54) SYSTEMS AND METHODS INVOLVING INTEGRATION/CREATION OF SEARCH RESULTS MEDIA MODULES

(71) Applicant: OATH INC., New York, NY (US)

(72) Inventors: Doug Imbruce, New York, NY (US); Owen Bossola, Brooklyn, NY (US); Rasmus Knutsson, New York, NY (US); Tommy Chheng, San Francisco, CA (US); Hakim El Hattab, New York, NY (US)

(73) Assignee: OATH INC., New York, NY (US)

( * ) Notice: Subject to any disclaimer, the term of this patent is extended or adjusted under 35 U.S.C. 154(b) by 471 days.

(21) Appl. No.: 13/916,562

(22) Filed: Jun. 12, 2013

(65) Prior Publication Data

US 2017/0193107 A1   Jul. 6, 2017

Related U.S. Application Data

(60) Provisional application No. 61/658,908, filed on Jun. 12, 2012.

(51) Int. Cl.
*G06F 16/9535* (2019.01)
(52) U.S. Cl.
CPC ................ *G06F 16/9535* (2019.01)
(58) Field of Classification Search
CPC ............ G06Q 30/02; G06Q 30/0267; G06Q 30/0269; G06Q 30/0241; G06F 17/30867;
(Continued)

(56) References Cited

U.S. PATENT DOCUMENTS 6,108,033 A    8/2000  Ito et al.
6,173,437 B1   1/2001  Polcyn
(Continued)

FOREIGN PATENT DOCUMENTS

CN    101262395 A    9/2008
WO    2007064715 A2   6/2007

OTHER PUBLICATIONS

Agarwal, Amit; "How to Embed Almost Anything in your Website" (2009).
(Continued)

*Primary Examiner* — Robert W Beausoliel, Jr.
*Assistant Examiner* — Pedro J Santos
(74) *Attorney, Agent, or Firm* — James J. DeCarlo; Greenberg Traurig, LLP

(57) ABSTRACT

Provided herein are mixed-media modules with functional layers that can be used to provided additional information to targeted audience. Systems and methods are disclosed for performing processing involved with search, such as processing search information to return search results. In one exemplary implementation, there is provided a method for processing information to return search results including mixed-media media presentation(s) selectable by a user. Moreover, such method may involve user interaction to manipulate the presentation, display various media and/or effect other functionality. Further implementations may involve generation of interactive, visually rich mixed-media content of high information density providing improved user experience and/or improved value to various participants.

20 Claims, 35 Drawing Sheets

(58) Field of Classification Search
CPC ......... G06F 17/30965; G06F 17/30864; G06F 17/30398; G06F 16/9535
USPC .... 705/14.54, 14.66; 707/E17.121, 999.003, 707/E17.102, E17.108, 706, 728, 707
See application file for complete search history.

(56) References Cited

U.S. PATENT DOCUMENTS

| | | | |
|---|---|---|---|
| 6,271,840 B1 | 8/2001 | Finseth et al. | |
| 6,353,448 B1 | 3/2002 | Scarborough et al. | |
| 6,535,888 B1 | 3/2003 | Vijayan et al. | |
| 6,542,882 B1* | 4/2003 | Smith | G06F 17/3089 706/45 |
| 6,567,103 B1 | 5/2003 | Chaudhry | |
| 6,574,417 B1 | 6/2003 | Lin et al. | |
| 7,200,820 B1 | 4/2007 | Stephens | |
| 7,536,706 B1 | 5/2009 | Sezan et al. | |
| 7,613,731 B1 | 11/2009 | Larson | |
| 7,725,451 B2* | 5/2010 | Jing et al. | 707/707 |
| 7,836,110 B1 | 11/2010 | Schoenbach et al. | |
| 7,895,193 B2* | 2/2011 | Cucerzan et al. | 707/721 |
| 7,912,827 B2 | 3/2011 | Byers et al. | |
| 7,962,128 B2 | 6/2011 | Neven et al. | |
| 8,055,655 B1* | 11/2011 | He | G06F 17/30867 707/727 |
| 8,078,650 B2 | 12/2011 | McHugh et al. | |
| 8,244,707 B2 | 8/2012 | Lin et al. | |
| 8,255,291 B1 | 8/2012 | Nair | |
| 8,352,443 B1 | 1/2013 | Polson et al. | |
| 8,549,436 B1 | 10/2013 | Capriati et al. | |
| 8,577,911 B1 | 11/2013 | Stepinski et al. | |
| 8,631,029 B1* | 1/2014 | Amacker | G06F 17/30554 707/766 |
| 8,639,034 B2 | 1/2014 | Liu et al. | |
| 8,769,053 B2 | 7/2014 | Spitz et al. | |
| 8,782,690 B2 | 7/2014 | Briggs et al. | |
| 8,813,132 B2 | 8/2014 | Andrews, II et al. | |
| 9,147,154 B2 | 9/2015 | Wang et al. | |
| 9,183,277 B1 | 11/2015 | Kurzion et al. | |
| 2004/0059720 A1 | 3/2004 | Rodriguez | |
| 2004/0205515 A1 | 10/2004 | Socolow et al. | |
| 2005/0216859 A1 | 9/2005 | Paek et al. | |
| 2006/0253436 A1 | 11/2006 | Cook et al. | |
| 2007/0008322 A1 | 1/2007 | Ludwigsen | |
| 2007/0078872 A1 | 4/2007 | Cohen | |
| 2007/0101387 A1 | 5/2007 | Hua et al. | |
| 2007/0156647 A1* | 7/2007 | Shen | G06F 17/30867 |
| 2007/0185860 A1 | 8/2007 | Lissack | |
| 2007/0203945 A1 | 8/2007 | Louw | |
| 2007/0214121 A1 | 9/2007 | Ebanks | |
| 2007/0250899 A1 | 10/2007 | Rhodes et al. | |
| 2007/0294619 A1 | 12/2007 | Krishnaswamy et al. | |
| 2008/0027928 A1 | 1/2008 | Larson | |
| 2008/0028023 A1 | 1/2008 | Locke | |
| 2008/0028037 A1 | 1/2008 | Moyer et al. | |
| 2008/0086688 A1 | 4/2008 | Chandratillake et al. | |
| 2008/0215416 A1* | 9/2008 | Ismalon | 705/10 |
| 2008/0244373 A1 | 10/2008 | Morris et al. | |
| 2008/0276269 A1 | 11/2008 | Miller et al. | |
| 2009/0003800 A1 | 1/2009 | Bodin et al. | |
| 2009/0019034 A1 | 1/2009 | Franks et al. | |
| 2009/0019078 A1 | 1/2009 | Chisholm et al. | |
| 2009/0063423 A1 | 3/2009 | Kelly et al. | |
| 2009/0077037 A1* | 3/2009 | Wu | G06F 17/30867 |
| 2009/0271842 A1 | 10/2009 | Baumhof | |
| 2009/0313260 A1 | 12/2009 | Mimatsu | |
| 2009/0327268 A1 | 12/2009 | Denney et al. | |
| 2010/0083077 A1 | 4/2010 | Paulsen et al. | |
| 2010/0146042 A1 | 6/2010 | Kruhoeffer et al. | |
| 2010/0211565 A1 | 8/2010 | Lotito | |
| 2010/0332489 A1 | 12/2010 | Benari et al. | |
| 2010/0332497 A1* | 12/2010 | Valliani | G06F 17/30781 707/759 |
| 2010/0333123 A1 | 12/2010 | Mehta | |
| 2011/0010367 A1 | 1/2011 | Jockish et al. | |
| 2011/0060756 A1 | 3/2011 | Schoenbach et al. | |
| 2011/0064387 A1 | 3/2011 | Mendeloff et al. | |
| 2011/0161308 A1 | 6/2011 | Andersen et al. | |
| 2011/0161333 A1 | 6/2011 | Langseth et al. | |
| 2011/0191321 A1 | 8/2011 | Gade et al. | |
| 2011/0196864 A1 | 8/2011 | Mason et al. | |
| 2011/0225066 A1 | 9/2011 | Carter | |
| 2011/0276555 A1 | 11/2011 | Fiero | |
| 2011/0288913 A1 | 11/2011 | Waylonis et al. | |
| 2012/0047134 A1 | 2/2012 | Hansson et al. | |
| 2012/0051668 A1 | 3/2012 | Martin et al. | |
| 2012/0059838 A1 | 3/2012 | Berntson et al. | |
| 2012/0203757 A1* | 8/2012 | Ravindran | 707/706 |
| 2012/0211565 A1 | 8/2012 | Colavito et al. | |
| 2012/0249870 A1 | 10/2012 | Senster | |
| 2012/0278465 A1 | 11/2012 | Johnson | |
| 2012/0310924 A1* | 12/2012 | Carpenter | G06F 17/3064 707/722 |
| 2012/0323897 A1* | 12/2012 | Daher et al. | 707/723 |
| 2013/0097125 A1 | 4/2013 | Marvasti et al. | |

OTHER PUBLICATIONS

Crosby, Connie; "Prezi: Shaking Off the PowerPoint Death Grip", http://www.slaw.ca/2010/10/25/prezi-shaking-off-the-powerpoint-death-grip/ (2010).

European Search Report in correspopnding EP Application No. 12859456.1 dated Jan. 7, 2016.

https://getsatisfaction.com/prezi/topics/creating links that jump to other parts of the prezi (2010).

International Search Report and Written Opinion to PCT/US2012/071095 dated May 7, 2013 (10 pages).

International Search Report (PCT/US13/45529) dated Feb. 27, 2014; 4 pages.

Limpag, Max, "Forget PowerPoint wow 'em with Prezi", http://max.impag.com/article/powerpoint-prezi-presentation (2011).

O'Neill, Megan, "7 Little Known Tricks That Will Get You More YouTube Views", http://www.adweek.com/sociatimes/get-more-youtube-views/44158 (2011).

Supplemental European Search Report (EP12857892) dated Mar. 24, 2016.

* cited by examiner

SYSTEMS AND METHODS INVOLVING INTEGRATION/CREATION OF SEARCH RESULTS MEDIA MODULES

CROSS-REFERENCE TO RELATED APPLICATIONS

This application claims benefit/priority of provisional application No. 61/658,908, filed Jun. 12, 2012 and entitled "Systems and Methods Involving Features of Search and/or Search Integration;" which is incorporated herein by reference in its entirety.

BACKGROUND

Field:

Aspects of the present innovations relate to computer networking searches, and, more particularly, to associated systems and methods, such as processing search information, providing interactive search results, and search integration. In particular, provided herein are mixed-media modules with targeted content (e.g., news or advertisement) for a specific user. Also provided herein are methods and systems for creating such mixed-media modules.

Description of Related Information:

The web has evolved into a rich, multi-media experience, but the process of searching online and associated drawbacks have changed little in the last fifteen years. Search is still primarily text based (captions) with only small thumbnail images (or previews) appearing as a visual search result. Text captions are machine generated and are not a rich or efficient user experience. Also, humans process visual information much faster than we process text, but there is limited visual information in search results. Search engines have tried to remedy this problem by providing "live previews" of the source web pages and presenting them in text and graphical form. Unfortunately, this process is expensive, storage heavy and adds little value for the end user. Further, Internet search results often result in lists of hyperlinks that are not very informative to the searching user.

For example, FIGS. 1 and 2 show exemplary screenshots of prior art search result pages. These prior art examples show how generally, when an end user performs an Internet search, the search engine produces a search results page (also called an "SERP"). The prior art, as shown in FIGS. 1 and 2, contain lists of results with hyperlinks and a sentence or two about each result, 101, and 201. That text, 101, 102, is machine-selected by proprietary algorithms unique to each search engine—as opposed to being curated by humans—and is sometimes a random and not adequate description of the linked page. As such, there is no end-user control of the displayed text.

The selected text is called a "caption" as shown in FIG. 1 at 101, and FIG. 2 at 201. Captions were first used when there was no rich media on the web and, therefore, were only text-based. Because of this legacy, architecture search results are mostly text-based captions as shown in FIGS. 1 and 2, the way users consume this media is in a limited format—meaning that they can only view search results as one form of media at any given time, such as limited to just video, or just text.

Continuing with FIGS. 1 and 2, the prior art presented results as text, still images or video. There is not a great deal of context to the captions in search results and the presentation of those results is different from every search engine even though each search engine has its own proprietary search algorithms. In order to refine a search in the prior art systems, one must start a search over or hit the "back" button to return to earlier results. Further, searches from mobile devices only compound problems in the prior art. With limited screen real estate, proprietary operating systems, limited bandwidth and a variety of interfaces, such as touch, voice, keyboards—both on screen and physical.

FIGS. 3 and 4 are illustrations of exemplary prior art web page previews. FIGS. 3 and 4 show that even when an entire page is presented as a live preview, 301, 401—as it is with example company SERP, there is not much value added to the user's search. The information is densely packed and the graphics are too small to be useful. Only the general layout of the page is discernible which does little in terms of adding content or context.

Another problem is that search engine results are often inaccurate and imperfect. Text captions do not always accurately represent the content on a site because they lack context and richness. As a result, a search may not be efficient. Users often waste time uncovering the actual context of individual search results.

Currently, companies or website publishers do not have control over how their caption(s) appear within a SERP. The captions are algorithmically machine generated and cannot be curated by the owner of a site.

In sum, there is a need for systems and methods that address the above drawbacks an/or provide other beneficial functionality or advantages to parties involved with search.

SUMMARY

Systems and methods consistent with the present innovations are directed to implementations such as processing search information, providing interactive search results, and search integration, among others. According to some implementations, system and methods herein may allow for search results of improved nature, such as results that are interactive, expanded, deeper and/or richer as a function of mixed-media components, as well as improved value to all participants and improved user experience, among other benefits.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

DESCRIPTION OF THE DRAWINGS

The accompanying drawings, which constitute a part of this specification, illustrate various implementations and features of the present inventions and, together with the description, explain aspects of innovations herein. In the drawings.

DETAILED DESCRIPTION OF ILLUSTRATIVE IMPLEMENTATIONS

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

According to some implementations, systems and methods consistent with the innovations herein are directed to providing search results with improved features. For example, aspects herein may relate to innovative integration of a rich, mixed-media, interactive component, sometimes referred to as a 'Qwiki'™ component or module, into search results pages. In some implementations, this component or module may be an interactive narrative presentation of the content that is being searched and it may feature an interactive layer which allows the recipient of the search result to receive more detailed information without leaving the search engine results page ("SERP"). According to certain embodiments, systems and methods involving search results integrated with these component(s) may include features that are innovative over existing systems due to the information density and mixed-media/multimedia capabilities of such "mixed-media" integrated component(s). The terms "mixed-media module" and "multimedia module) are used interchangeably unless otherwise specified.

As set forth herein, implementations may involve the integration of such component into a search engine results page (SERP). This can be any existing or future SERP including those popular today. Moreover, various SERP-component integrated systems and methods herein provide display of search engine results in an interactive playable format compatible with mobile devices and their variety of interfaces.

Figure 1A:
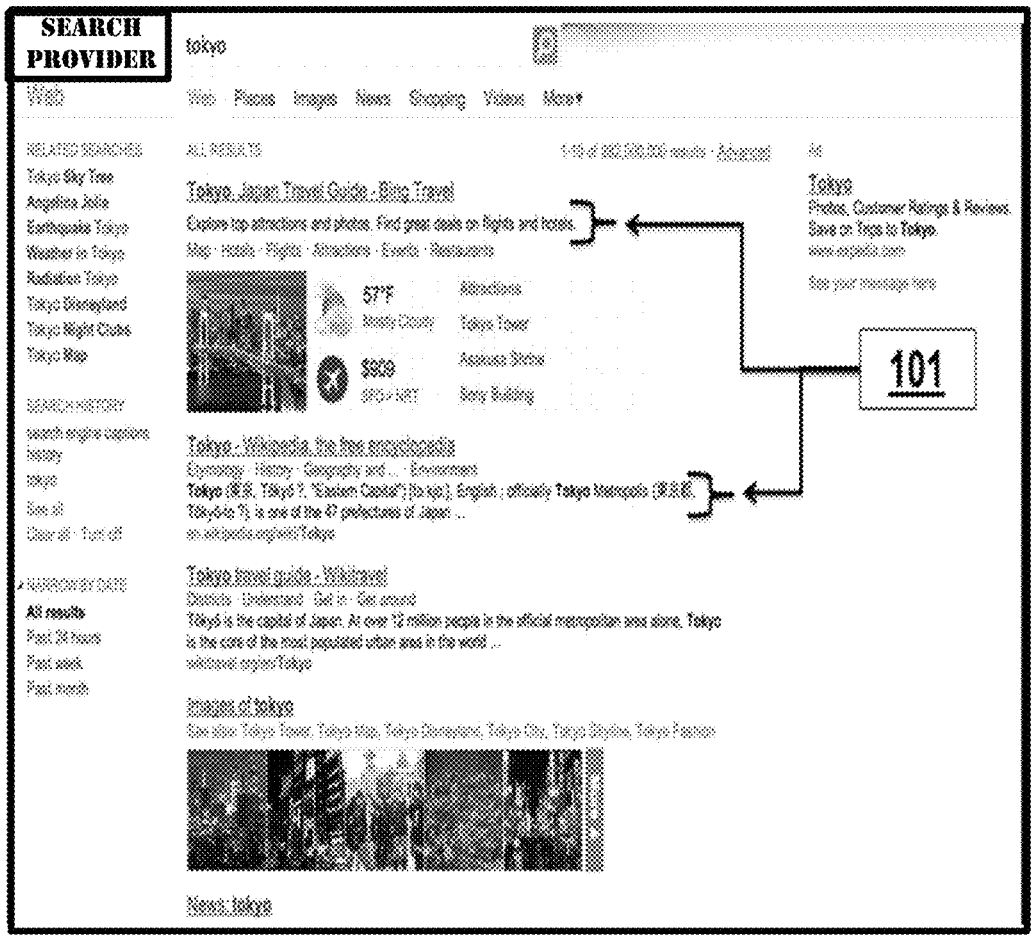
FIG. 1A is an exemplary screenshot of a prior art search result page.
Figure 1B:
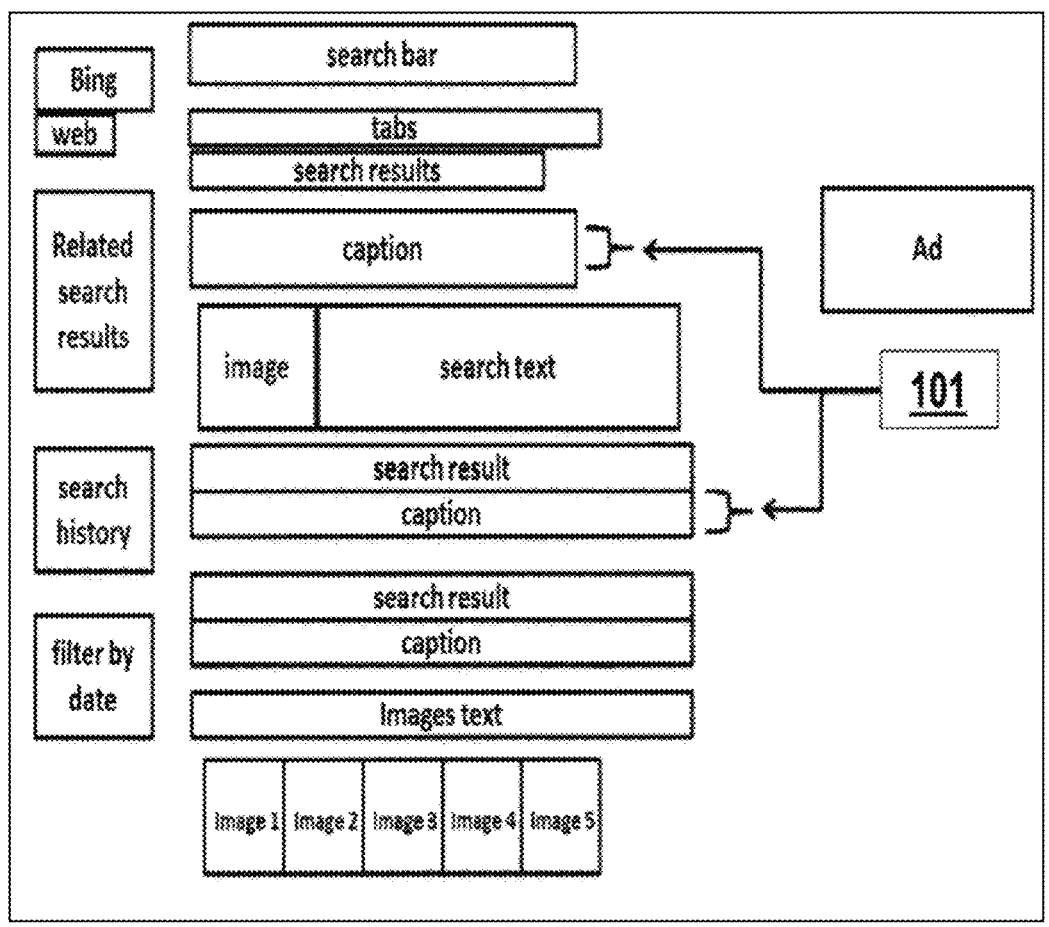
FIG. 1B is block diagram of FIG. 1A.
Figure 2A:
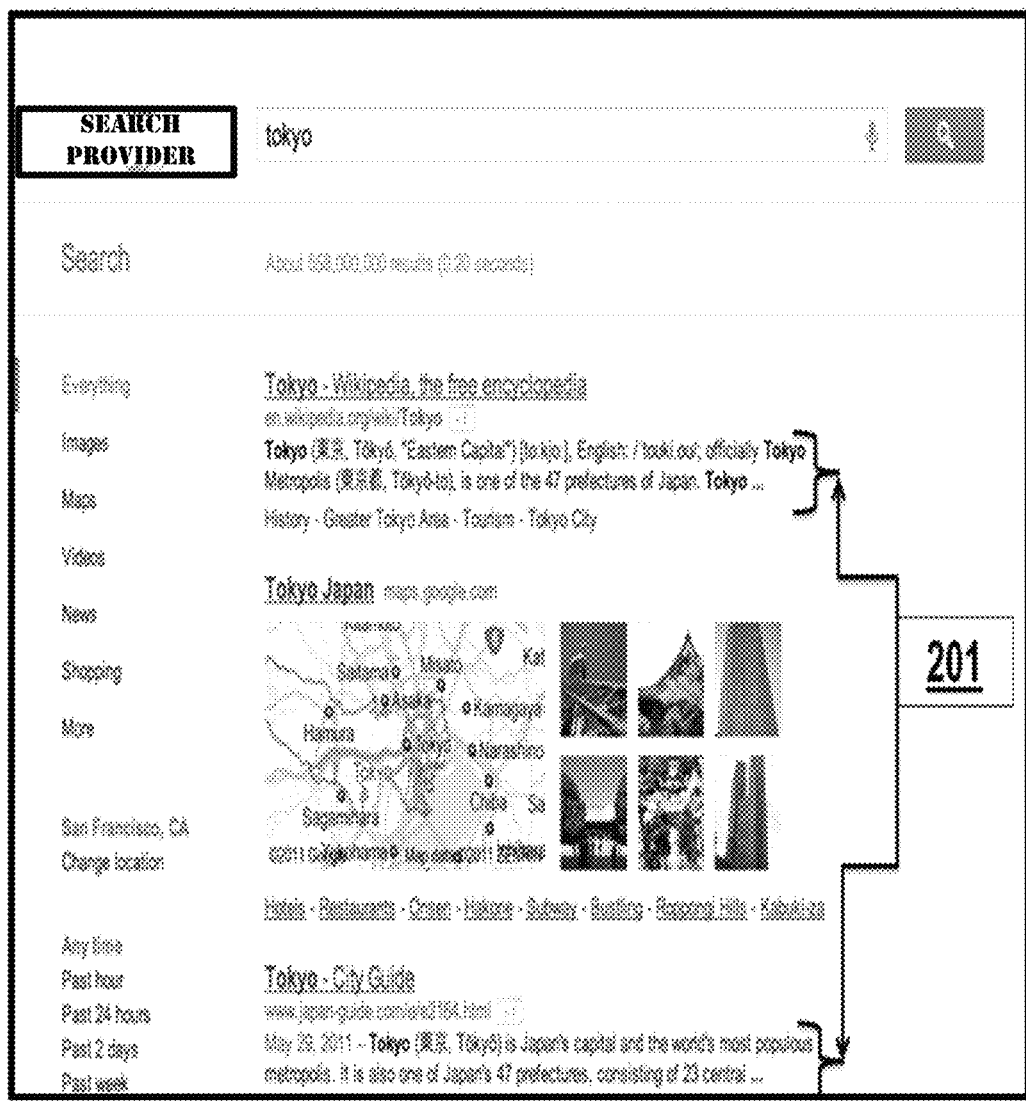
FIG. 2A is an exemplary screenshot of a prior art search result page.
Figure 2B:
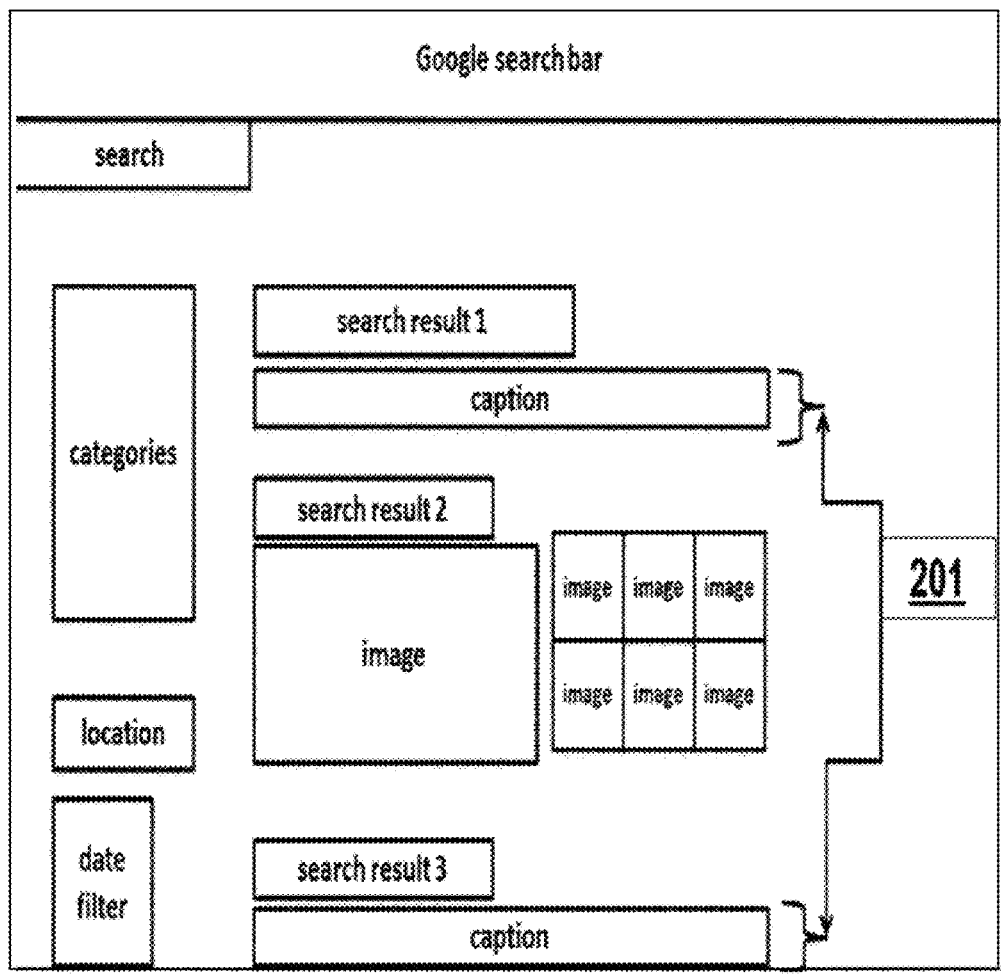
FIG. 2B is block diagram of FIG. 2A.
Figure 3A:
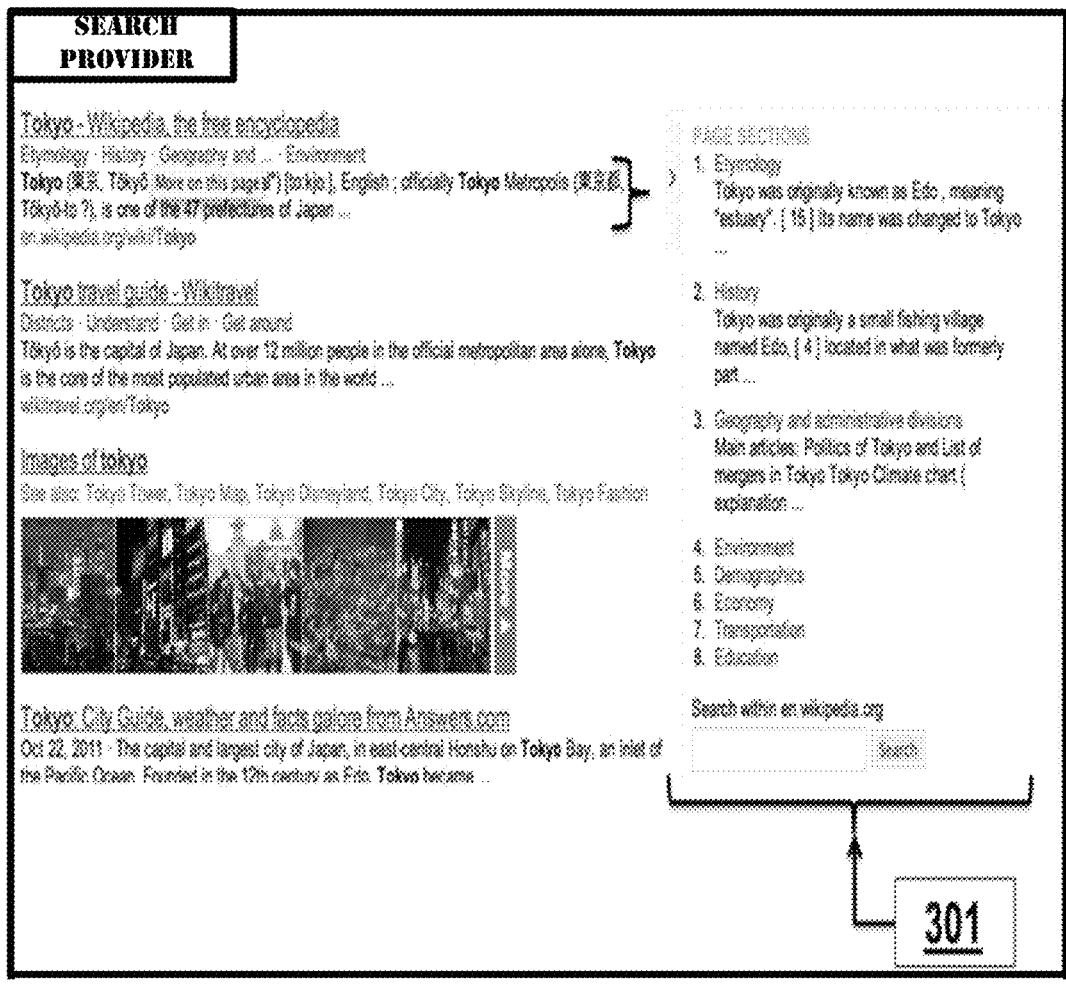
FIG. 3A is an illustration of exemplary prior art web page previews.
Figure 3B:
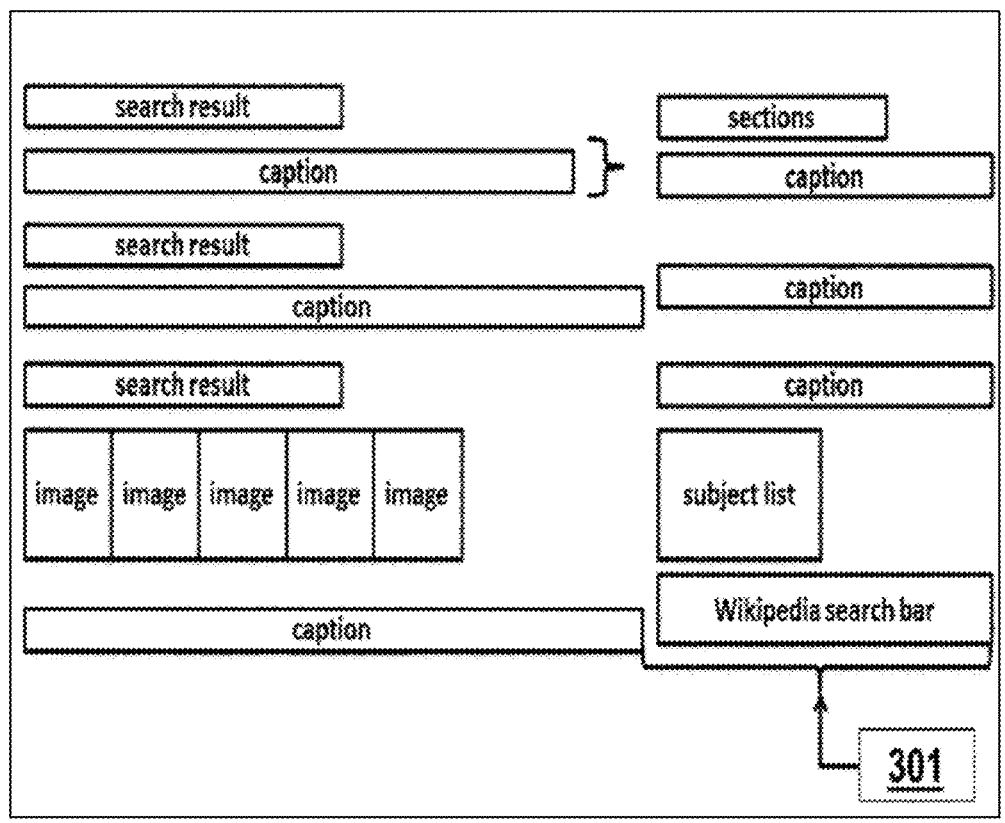
FIG. 3B is block diagram of FIG. 3A.
Figure 4A:
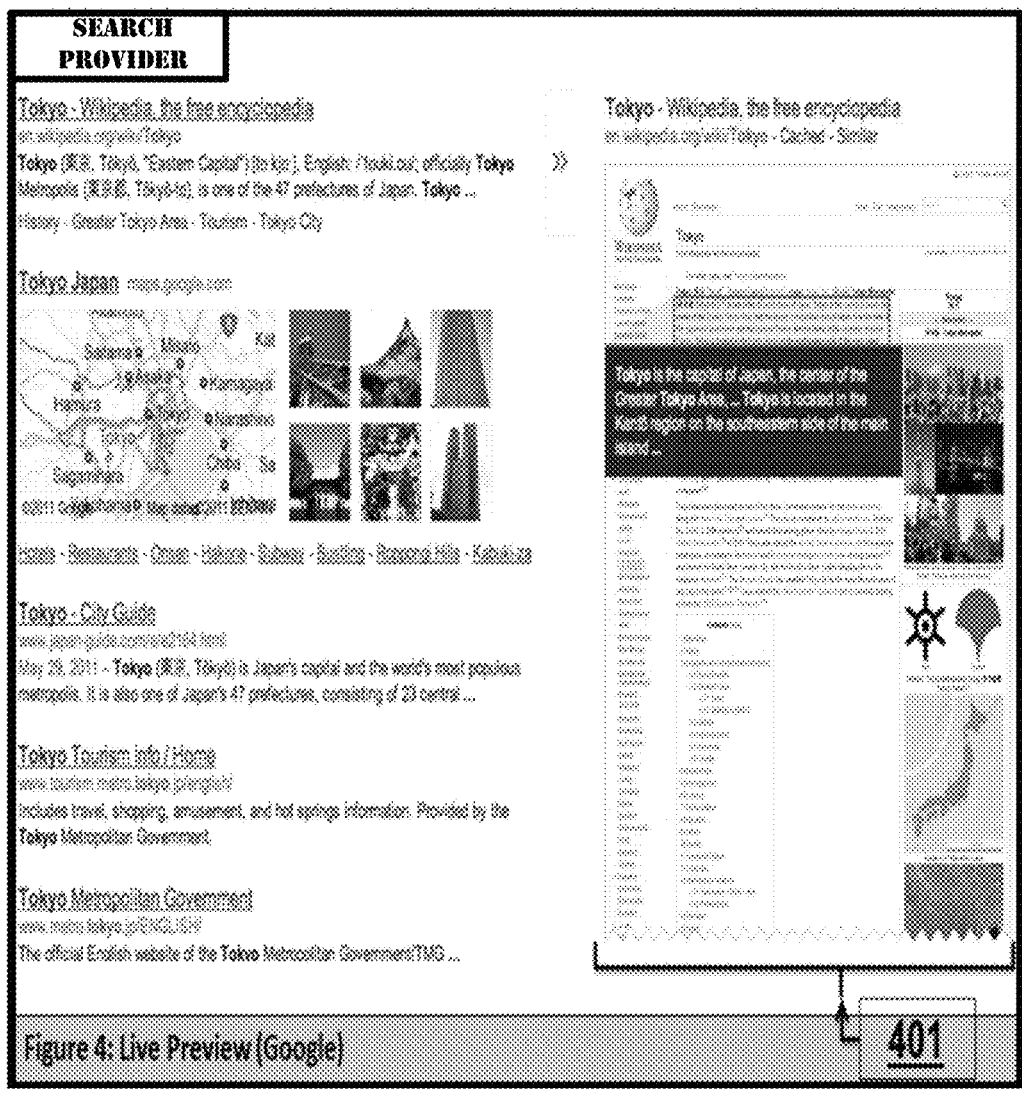
FIG. 4A is an illustration of exemplary prior art web page previews.
Figure 4B:
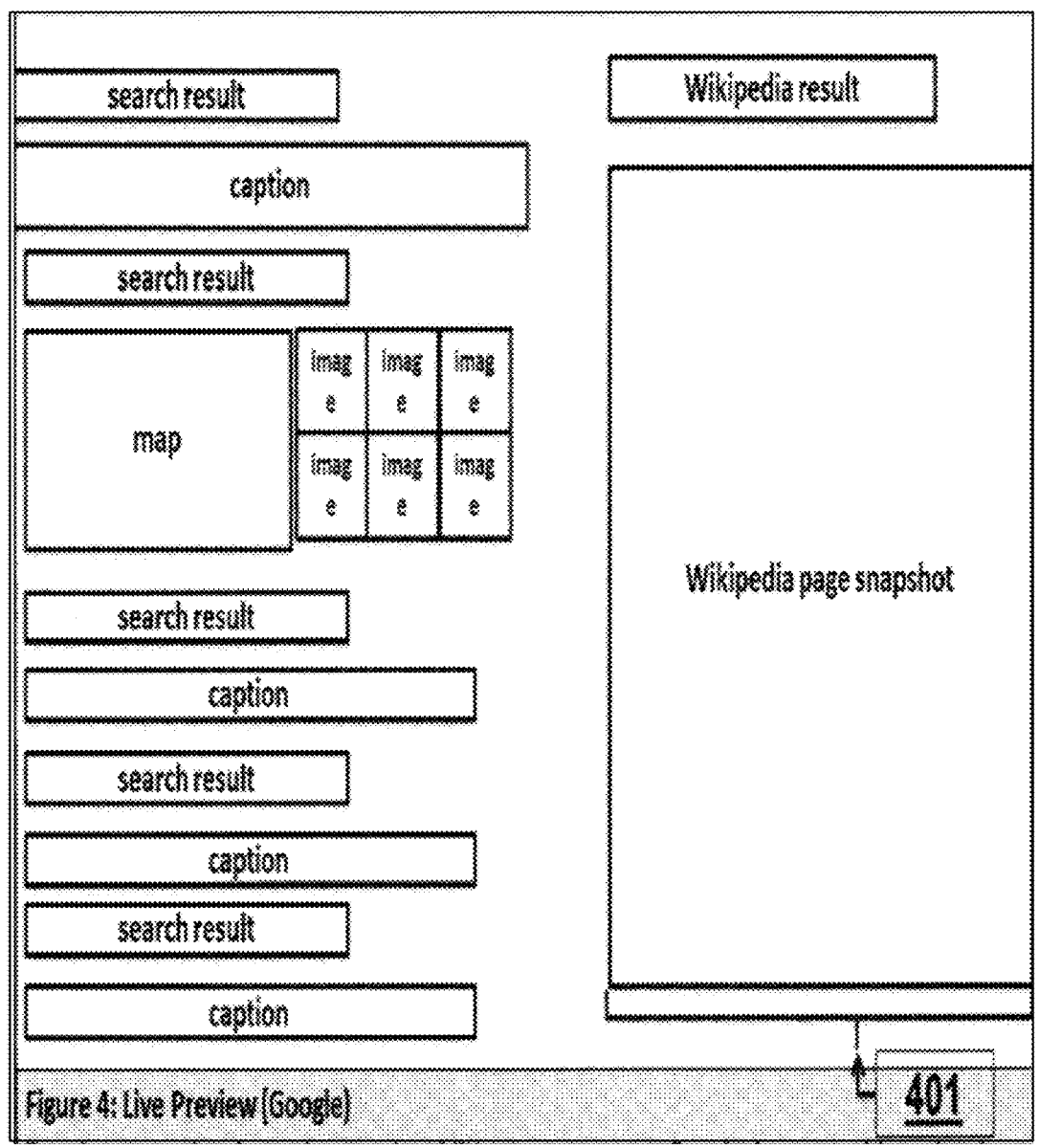
FIG. 4B is block diagram of FIG. 4A.
Figure 5A:
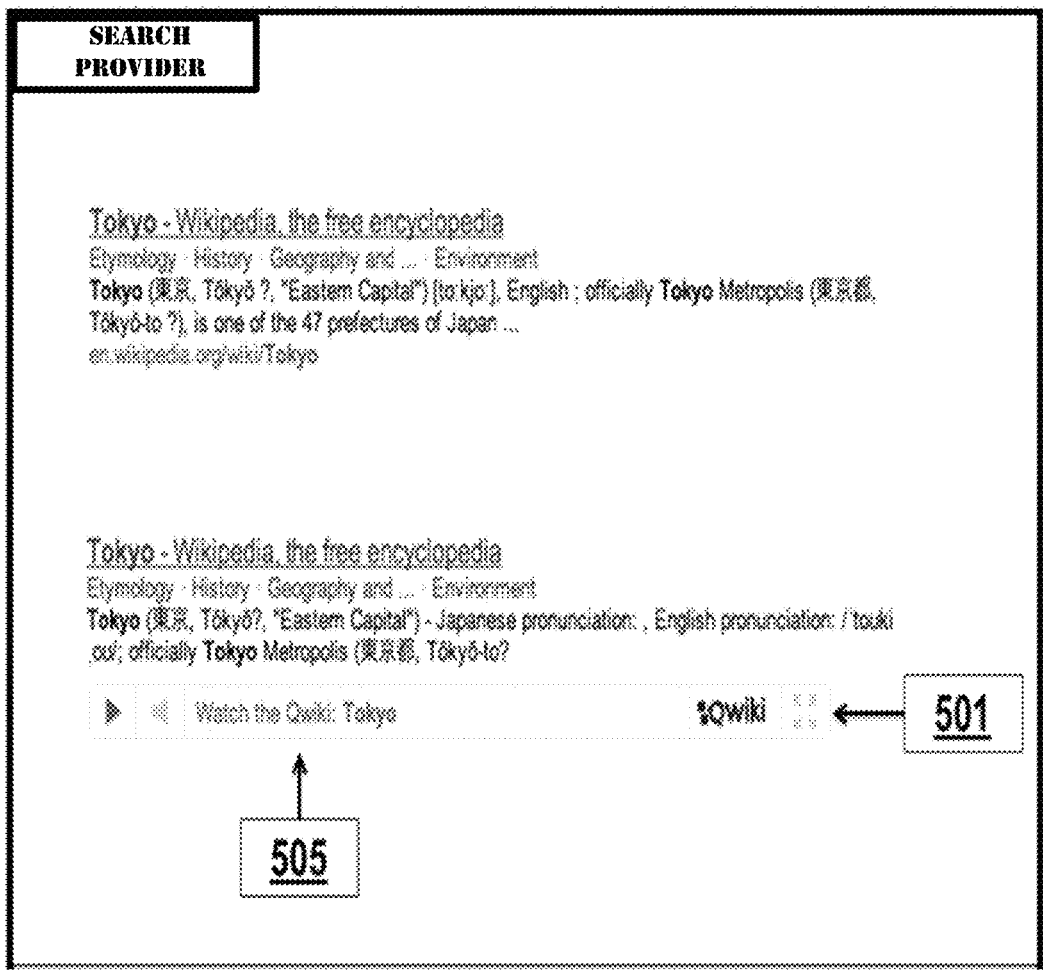
FIG. 5A is an illustration of a search engine results page with integration features consistent with certain aspects of the innovations herein.
Figure 5B:
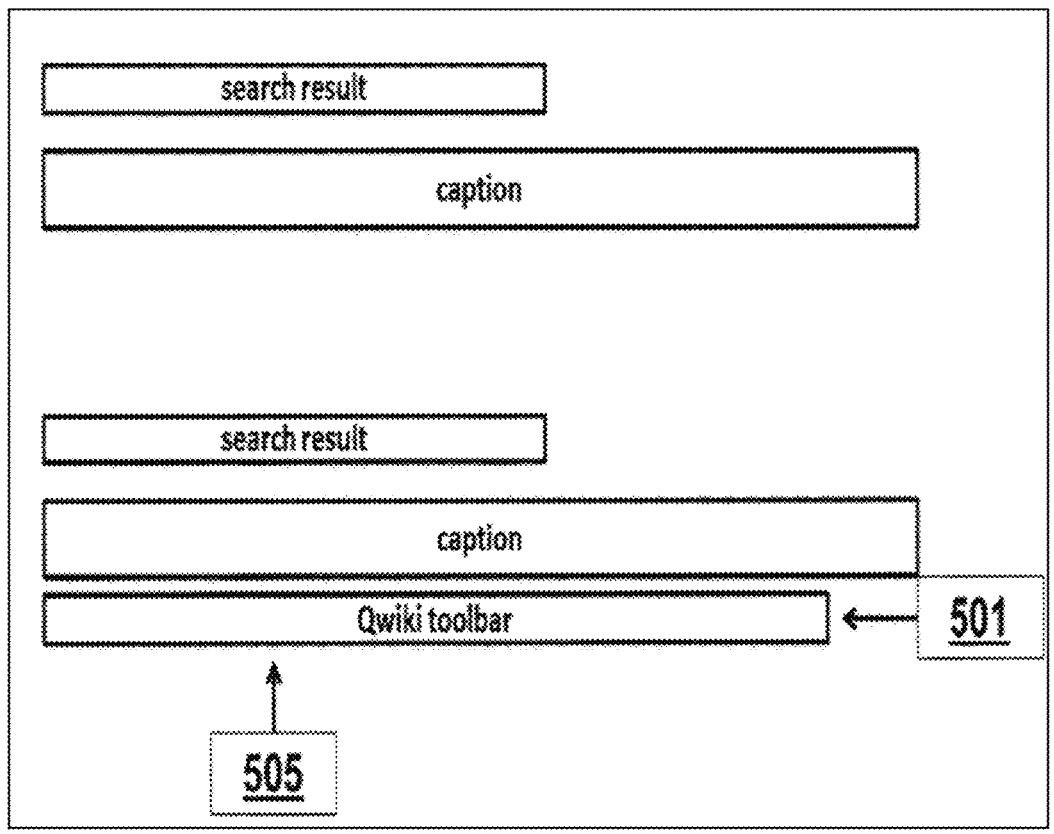
FIG. 5B is block diagram of FIG. 5A consistent with certain aspects of the innovations herein.

In one aspect, provided herein are mixed-media modules that can be presented to users as internet search results, which provide numerous enhanced features over conventional search results (e.g., more diverse type of media, more compact/accurate information with reduced or no redundancy, etc.). FIGS. 5A and 5B are illustrations of an exemplary search engine results page including an integrated mixed-media module 500 consistent with aspects of the innovations herein. Such implementations allow the user to stay on the search page and efficiently interact with the search engine in a way that is beneficial for that search engine through deeper more refined searches, increased ad views and clickthrough rates (CTR). Further, in various embodiments set forth herein, the integrated component may include features that serve as an "interactive summary" of a web page/search result which enhances the utility of the search experience. This results in higher quality searches and the increased revenue for the search provider, such as through re-queries (deeper searches in the existing topic).

In one illustrative implementation, for example, there is provided a method of processing search information comprising, processing information to return, to a user, search results via a search engine, in a results page. The search results page, in one example includes at least one pre-prepared, non-rendered narrative multimedia presentation. The example method further comprising, providing, for display via a search results page, at least one interactive multimedia presentation selectable by the user. In particular, such multimedia presentation may be a mixed-media module (also referred to as "MMM" herein) as specified herein. Additionally, the example method further comprising providing, as a function of a first interaction of the user with a selected multimedia presentation, user access to at least one of third party information, web sites, content, applications and/or other multimedia. Also, the example method could include providing, as a function of a second interaction of the user with the selected multimedia presentation, functionality configured to receive a new search query and generate a new search results page.

Further integrations of such components with search results also involve creation of new ad units (and thereby, in some implementations, new sources of revenue) inside of the mixed-media interactive summary, as explained further below.

Consistent with certain implementations, another way systems and methods herein may depart from the traditional search experience, and from online video, is that the end user does not have to experience the mixed-media module in a linear fashion. The user can choose their path through the content with various functionality, such as clicking on hyperlinks within the mixed-media module, via navigation functionality/gestures, and the like. This allows the end-user to explore the information that is of the most interest to them, in greater detail and in their preferred format, e.g., text, photos, video, etc.

Turning again to FIGS. 5A and 5B, a mixed-media module 501 can be a controllable media component within a search results page. Here, for example, a mixed-media module may give the publisher of a site control over its brand and its content as it appears on the search results page within such mixed-media module. This may be accomplished via creator tools associated with creation of such modules that generate an embeddable interactive object, or via markup language that publishers can include on their site that is recognized by search engine crawlers. This also leads to a better search experience for the end user. Implementations include the integration of a multimedia component such as a mixed-media module into the SERP of an Internet search engine as illustrated in FIGS. 5A-5B. Such component/module's interactive summary creates a playable caption that surfaces the best contents from the page. The title in this illustration, for example, "Watch the Qwiki [module], Tokyo" may specified by a mixed-media module elements 501 and 505.

In some embodiments, a mixed-media module is offered as a search result in addition to a listing of traditional text-based search result; e.g., illustrated as element 500 in FIGS. 5A and 5B. For example, one or more mixed-media modules are listed under a listing for a news article concerning an event or a person (e.g., the mixed-media modules are arranged in an array, a grid, or as pages of a storybook). In such embodiments, the mixed-media modules are associated with the news article and provide additional and multi-dimensional media to allow a user to explore the event or person at great depth.

In some embodiments, a mixed-media module is offered as a search result without a listing of traditional text-based search result. In such embodiments, multiple mixed-media modules are presented in an array, a grid, or arranged as pages of a storybook. In some embodiments, a mixed-media module can be played by clicking on an icon representing the mixed-media module; for example, the icon is marked with a play symbol. In some embodiments, a mixed-media module can be played by moving the mouse over the icon representing the mixed-media module. In some embodiments, the mixed-media module search results are depicted as a toolbar (e.g., element 501 in FIGS. 5A and 5B. In some embodiments, the toolbar includes a title 505 suggesting the content of the mixed-media module. In some embodiments, the toolbar includes a play icon that allows user to initiate or start playing the mixed-media module (e.g., by mouse-over, clicking the play icon, a tap motion or other gesture on a mobile device). In some embodiments, the toolbar includes a functionality for controlling the volume of the mixed-media module. In some embodiments, the toolbar includes a functionality for controlling the volume of the mixed-media module. In some embodiments, the toolbar includes a functionality for adjusting the size of the visual display of the mixed-media module.

In some embodiments, one or more mixed-media modules are offered as search results dynamically as a user enters a search term. For example, as a user enters a search term, a list, array or grid of mixed-media modules appear on a dropdown menu. In some embodiments, the mixed-media modules included on a dropdown menu change dynamically as the user enters and completes the search term. For example, when a user enters "t," mixed-media modules concerning target (the store), twitter (the company), tea (the drink), ted (the talk) and Ted (the airline) can be presented as search results. When a user enters "ti," mixed-media modules concerning New York Times (the newspaper), ticketmaster (the ticket vendor company), and Titanium (the element) can be presented as search results. Similarly, when a user enters "tiger," mixed-media modules concerning tigers (the animal), Tiger Wood (the golfer), tiger prawn (the big shrimp) and TigerDirect (the website selling electronics and more) can be presented as search results. In such embodiments, a user can be connected with the most relevant result by completing/providing more details to the search terms or simply selecting the most relevant result among the dynamically provided mixed-media modules. Exemplary method steps concerning the autofill functionality is depicted in FIG. 17B.

In one aspect, mixed-media modules provided as internet search results they present diverse, more in depth, and multi-dimensional information that easily encompass content found in multiple, dozens or even hundreds of conventional search results (e.g., FIGS. 1-4). In some embodiments, a mixed-media module serves as a platform for presenting more diverse, compact, multi-dimensioned information. For example, the mixed-media module depicted in FIGS. 6A and 6B include combines graphic (e.g., an interactive map), audio (e.g., music or audio caption), image (pictures relevant to the search term), video and textual information in an integrated form. Using a toolbar similar to one described in connection with FIGS. 5A and 5B, a user can navigate the mixed-media module and select the viewing experience by choosing the desirable audio and video settings, as described in details hereinbelow.

Figure 6A:
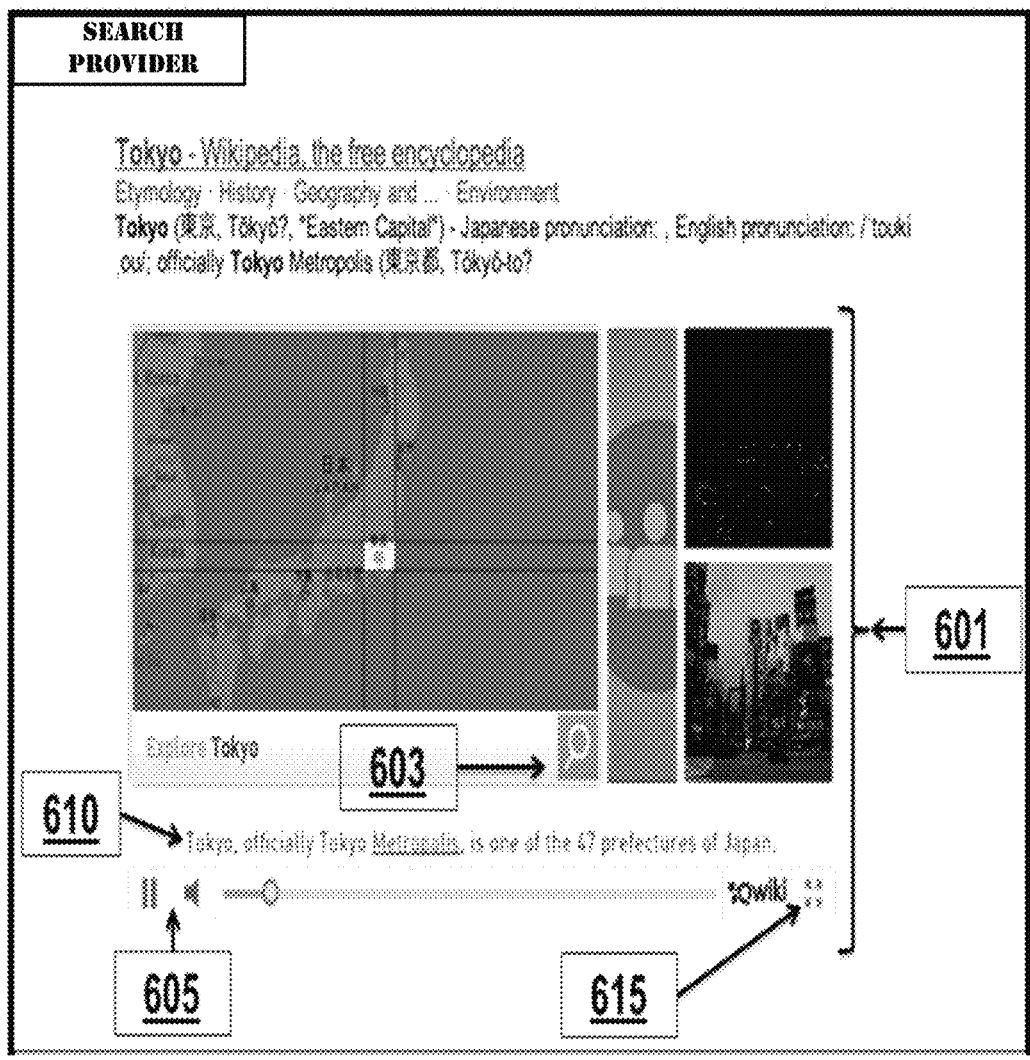
FIG. 6A is an illustration a live preview showing an example search engine results page consistent with certain aspects of the innovations herein.
Figure 6B:
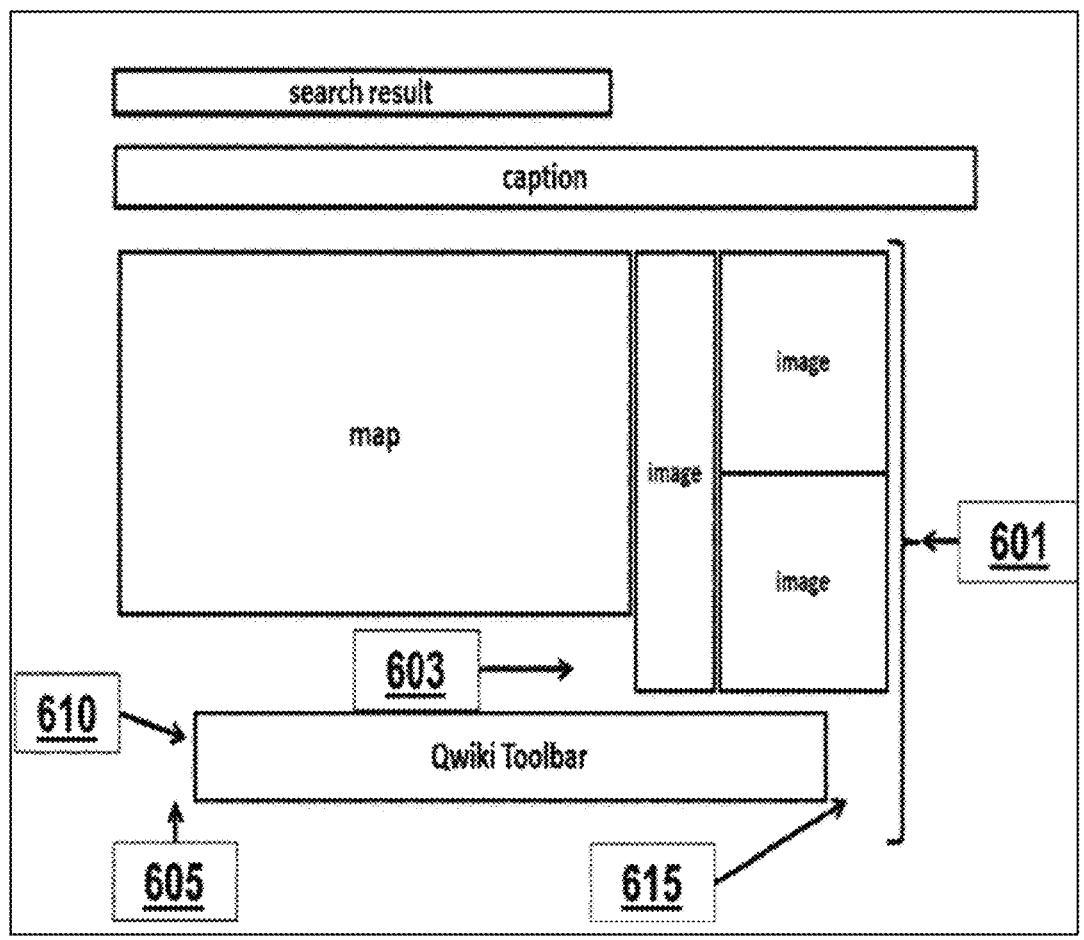
FIG. 6B is block diagram of FIG. 6A consistent with certain aspects of the innovations herein.

FIGS. 6A and 6B depict exemplary preview illustrations showing illustrative search engine results pages with mixed-media modules. Consistent with this basic preview as explained herein, a mixed-media module integrated into the search results page provides for a richer user experience and increases traffic for that page. Further, implementations may include playable captions that provide more context than regular text captions used in existing systems.

Consistent with the innovations herein, systems and methods are provided involving procedures and/or mechanisms for enhancing search results via novel integration of mixed-media modules. Such implementations may present coordinated text, images, video, documents, narrations and links all available in one interactive screen format or window. Examples of these can be seen in FIGS. 6A and 6B. Here, for example, the mixed-media module may be a rich multimedia visual and interactive piece of content. A search results page, SERP, integrated with such mixed-media module acts as an interactive multimedia summary of a search result rather than just a text based caption integrated into an SERP as previously done.

As seen in connection with FIGS. 6A and 6B, the typical search engine result is augmented or even replaced by a mixed-media module 601 that enhances the results. Navigation to a desired result, e.g. a selected mixed-media module, may be an expansion inside the normal search results into a larger display. Further, a 'new search' button, icon or functionality may be included within mixed-media modules, e.g., a magnifying glass icon 603. This may be configured to allow for further searching or re-querying within the mixed-media module. Further, a media/asset loading bar 605 may also be included, allowing for audio and/or video to play in the mixed-media module or in another window. The mixed-media module may also include one or more hyperlinks 610 to other web pages. An expander button 615 may also be included to allow for the mixed-media information in the module to be displayed in a full screen format.

With regard to these implementations, such as 'new search' functionality, systems and methods herein may involve methods of processing search information comprising a computer server configured to communicate with at least one search engine web crawler. Exemplary methods also may include the computer server configured to receive the search engine web crawler results from at least a first query, and to generate search results for display in a browser window based on the first query. Methods may also include embodiments involving provision of search results include at least a customizable caption, various multimedia content, and at least one hyperlink configured to cause a re-query of the search engine web crawler.

Referring still to FIGS. 6A and 6B, in accordance with some aspects of the innovations herein, a mixed-media module integrated SERP also improves the usefulness of search. A seen in FIGS. 6A and 6B, such interactive component has a higher density of information than the prior art, which proves to be more valuable to the end user, online content providers, and the search engines. The search engine crawlers can detect certain mixed-media module, such as via detection of metadata associated with Qwiki™ modules, and embed it in a search results page (SERP). Further, implementations herein may utilize the mixed-media module as an interactive and playable caption, 605.

According to implementations herein, once played, the mixed-media module may expand within the page as shown in FIG. 6 at 601 and can offer the user a variety of options to explore related content triggering new search queries, 603, media/asset loading, 605, links to related pages, 610, and playback options, 615. Further, component video or audio files may be played within the mixed-media module on the SERP, without need for loading an external page.

In some embodiments, a user can navigate or view the content of a mixed-media module in a non-linear fashion; for example, a user can explore the interactive map depicted in FIGS. 6A and 6B. Alternatively or in combination with the interactive content, a user can select an embedded executable link (e.g., element 610) to go to a relevant external website. In some embodiments, the external website provides additional information about a specific piece of content of the mixed-media module. In some embodiments, the external website offers the user the choice to browse possible commercial websites that are relevant to the mixed-media module. For example, links to hotels and restaurants in Tokyo. In some embodiments, the embedded links are opened as new tabs while the mixed-media module is preserved in the original web interface. In some embodiments, the embedded links are opened as new windows while the mixed-media module is preserved in the original web interface. In some embodiments, the embedded links are opened as new split-screen windows in addition to the interface in which the mixed-media module is presented. In some embodiments, a user can select a specific split-screen window by a mouse-over motion, a clicking motion, or a tapping motion (e.g., on a mobile device or a touch screen device).

In addition to the display of related media/links in a new window on the same page, further implementations provide functionality to display associated content on the same SERP by instantly modifying it or the contents around it. Here, for example, this new integrated content may be displayed without triggering new tabs.

Additionally, in contrast to existing SERP functionality where captions are algorithmically machine generated and cannot be curated by relevant parties, systems and methods herein may provide a controllable interactive media component within a search results page. For the first time, then, implementations herein involving the mixed-media modules allow the publisher of a site control over its brand and its content as it appears on the search results page within the mixed-media module.

Further, consistent with certain aspects related to the innovations herein, present implementations improve upon and enhance existing search technologies because they provides narrative context to search results—something lacking until now. Results herein are a richer experience with more visual, linked information and interactive features.

As a function of the present mixed-media modules embodiments, which may be created by participants of the search process, search results may be more accurate and provide better context. Consistent with implementations herein, brand managers and content publishers can control their story within a search engine result without purchasing expensive search advertising. This is particularly valuable because existing captions are often not relevant for a search engine user they add little or no value to the process. They contain a limited amount of data and few clues as to the overall content of the site those captions are supposed to summarize. In other words, captions lack the context and visual richness provided via the innovations herein. Additionally, search engine results are clustered in a way that isn't helpful and can be overwhelming. Users get results that don't help with a decision because they are unrelated to what the user actually needs. The limited text in a caption often doesn't reveal enough information. As a result the user must select links, search that site and, if it is not the desired result, back up to the original search results or begin a new search from scratch. It's time consuming, awkward and makes things easy for a user to get lost.

In some embodiments, accuracy of search results is improved when redundant results are simplified or consolidated when a mixed-media module is created. For example, instead of dozens or hundreds of images of Tokyo, a mixed-media module only includes a few most representative images. In some embodiments, redundancy is detected by accessing the meta-data associated with the content (e.g., an image, a video or an excerpt from an article) that can be possibly used in a mixed-media module (e.g., only one of the most referred to image will be included). For example, content originated from the same source will be used only once. In some embodiments, meta-data associated with a piece of content (e.g., an image, a video or an excerpt from an article) can also be used for prioritizing the content; for example, the popular image or video will be highlighted in the mixed-media module (e.g., displayed in a larger size or over a longer period of time). As a consequence and advantage of the more accurate smart content selection, a more compact and efficient mixed-media module can be created. In addition, more types of information can be included in a mixed-media module because redundancy is removed or reduced.

Advantageously, a mixed-media module avoids respective information. Consequently, mixed-media modules provided herein present information more efficiently (e.g., by combining information that are available from multiple conventional search results), more accurately (e.g., the multi-dimensional data presented would help a user to make selection more accurately; redundant information is removed or occurred less frequently when a mixed-media module is created). Also advantageously, the multi-dimensional and in-depth presentation of diverse information, which is both rich in content and format, tends to increase the dwell time of a user, which is important for an information provider or distributor.

Figure 7A:
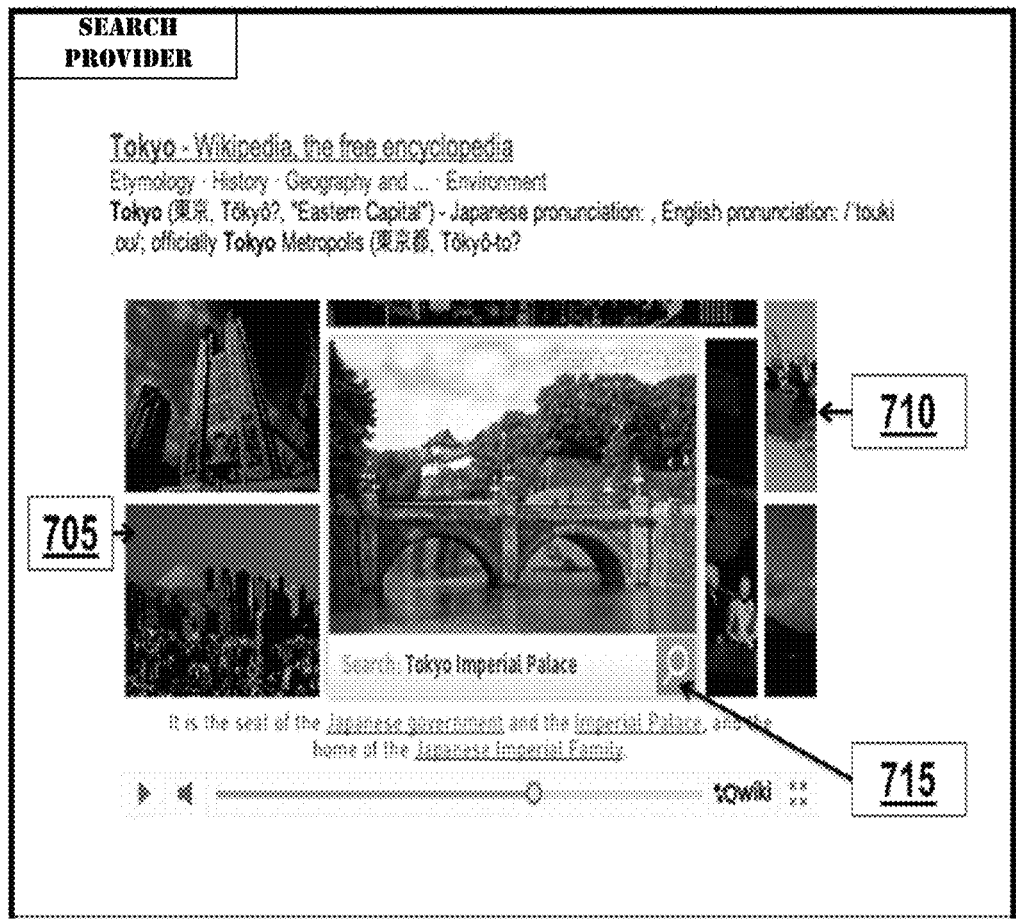
FIG. 7A is a diagram illustrating an example search engine results page from a re-query consistent with certain aspects related to the innovations herein.
Figure 7B:
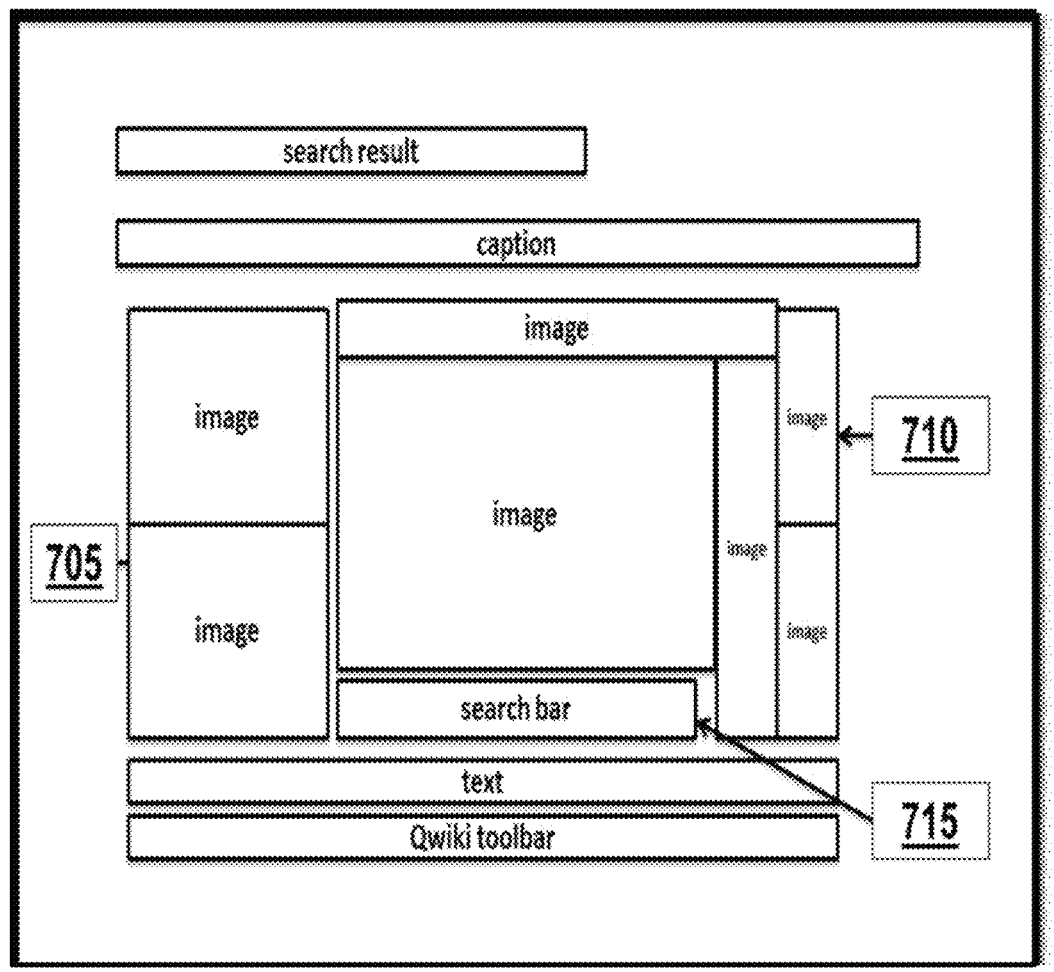
FIG. 7B is block diagram of FIG. 7A consistent with certain aspects of the innovations herein.

According to further embodiments, a search result enhanced via present mixed-media module(s) implementations may also involve innovations associated with second or follow-up queries, referred to herein as "re-query." FIG. 7 is a diagram illustrating an example search engine results page associated with a re-query, consistent with aspects of the innovations herein. Notably, a re-query allows a search engine user to refine their search results without losing the original search. Clicking on a hyperlink within the mixed-media module allows the user to "re-query" the search engine and dig deeper into a subject by searching the mixed-media/interactive components within a module. Implementations are also configured such that this opens a new window without closing the original one and thereby reduce the need to constantly hit the "back" button in order to return to the original results. This enables the ability to search, and then re-search specific details of interest within a search result without getting distracted or lost.

In one illustrative implementation, for example, there is provided a method of processing search information comprising processing information to return, to a user, search results via a search engine, in a results page. This example method could also include where the results page includes at least one pre-prepared, non-rendered narrative multimedia presentation, such as a mixed-media module. Further, the example method could include providing, for display via a search results page, at least one interactive multimedia presentation selectable by the user. Also, providing, as a function of a first interaction of the user with a selected multimedia presentation, user access to at least one of third party information, web sites, content, applications and/or other multimedia. And the example method could also include providing, as a function of a second interaction of the user with the selected multimedia presentation, functionality configured to receive a new search query and generate a new search results page.

Various "re-query" implementations also allows users to stay on a search page and refine their searches in new windows without losing the original search or getting lost. This is more efficient for users and less frustrating as they are more likely to find their desired results. Systems and methods herein may be configured to refine a SERP via such functionality, allowing for high information density. For example, the re-query can show selected caption with images 705. It can also show video or animation 710. Moreover, specific concepts may even be suggested for further re-query 715. In addition to the display of related media/links in a new window on the same page there is an option to display associated content on the same SERP by instantly modifying it or the contents around it. In some embodiments, this new integrated content is displayed without triggering new tabs. In some embodiments, this new integrated content is displayed in new tabs. In some embodiments, the new integrated content is presented as new split-screen windows in addition to the interface in which the mixed-media module is presented. In some embodiments, a user can select a specific split-screen window by a mouse-over motion, a clicking motion, or a tapping motion (e.g., on a mobile device or a touch screen device).

In some embodiments, a "re-query" implementation allows a user to search and identify other mixed-media modules as results of a new query, thus adding another level of multi-layered content to the search results. For example, referring to FIGS. 7A and 7B, a user can search "Tokyo Imperial Palace" within a general mixed-media module result concerning the broader search term "Tokyo." In some embodiments, in response to the new query, conventional search results (e.g., as illustrated in FIGS. 1-4) are presented. A user can access the conventional search results in manners similar to the access to embedded links. In some embodiments, in response to the new query, new and more specified mixed-media module results (e.g., mixed-media modules with more detailed and in-depth collection of information concerning "Tokyo Imperial Palace") are presented. A user can access the mixed-media module results in manners similar to the access to embedded links; e.g., as new tabs on a browser as split-screen windows. A user can navigate between the original mixed-media module and one or more new mixed-media modules by a mouse-over motion, a clicking motion or a tapping motion (e.g., on a mobile device or a touch screen device).

These "re-query" innovations may also drive a deeper understanding of a queried subject matter by displaying related search topics. As such, systems and methods herein provide for a mixed media/multi-media capability which can illustrate/enhance a selected search result with images, videos, animations, documents and even narrations. Specific concepts can be suggested for re-query, driving additional search engine traffic. This additional traffic yields higher advertising rates on the re-query pages as the searches are more specific and focused by a more specific customer interest. The richness of the re-queried media also achieves beneficial advertising results, given that richer media fetches an increased CPM/CPT (Cost Per Thousand impressions) that advertisers are willing to pay.

Systems and methods herein overcome other issues with search engine results, namely problems associated with search placement. Placement on the SERP is important because, the higher the placement, the more likely a site will be selected by a user. For this reason, the top of the page is seen as the most valuable real estate on an SERP. Entire industries have been created just to place a search result in a higher position in the SERP as processing pages and pages of text results is time consuming.

Presently search engines consider it a success when a user spends a minimal amount of time on their page. This might be counterintuitive, but it's because a quick search process means that the user is finding the information that they need and moving on. The down side to this is that the search engine only has a limited amount of time to display ads and monetize the interaction. As such, implementations herein provide an innovative and ideal scenarios for search engines, e.g., keeping users on their site through a layer of interactivity that allows for a deeper exploration of search results without leaving the original search time and time again.

While visual results in searches can yield better results, previews of websites are very expensive for search engines to create, maintain and store. Bandwidth is also an issue when end users access search engines via mobile devices. On mobile devices and smart phones, in particular, there is limited screen real estate and text-based search results are tiny and difficult to read. It's even more difficult for a user to differentiate between search results when looking at a tiny screen.

Moreover, many search engines are adding video content to their search results. Video is becoming more prevalent online because publishers don't want to present text-only sites and there is a desire to differentiate/supplement search placement; however, traditional streaming video is time-consuming to create and view. Video content is also highly compressed on mobile devices resulting in poor streaming and picture quality. Video is also hard to interact with because there is no standard, universal layer for interactivity. For the most part, video is a stand-alone experience because of the lack of an interactive layer. In addition, similar to exploring component web pages, watching and re-searching for appropriate videos is very time consuming—because of limited previews, users often don't know if they have discovered the right or wrong video related to their topic, as the videos are indexed and retrieved via keyword, not according to the content of the pages also part of the same search result.

Embodiments herein address these issues and drawbacks, as well. In one illustrative implementation, for example, there is provided a method of processing search information comprising a computer server configured to communicate with at least one search engine web crawler. The example method could also have the computer server configured to interact with the search engine web crawler search results by causing display of the search results. And the example method may include wherein the search results include interactive multimedia content, e.g., one or more mixed-media modules, and/or associated content such as at least one hyperlink, etc.

Especially in view of the issued with traditional video content noted above, systems and methods herein are an improvement on other rich media such as online video technology because they use less bandwidth, are easily customizable, flexible, incorporate interactive video, images, text and other types of media.

In still other exemplary embodiments herein, mixed-media module integrated implementations can incorporate interactive images, text and other types of media. Further, given such implementations operate without large-bandwidth video transmissions especially rendered video content for audiovisual/multimedia experience, systems and methods herein provide an expanded interactive search with other mixed media, thus allowing for quicker loads and consumption of less bandwidth during utilization.

Advantageously, the richness of a search result is further enhanced by the query-within-a-query result platform within a mixed-media module. Advantageously, search efficiency and accuracy are also enhanced by the query-within-a-query result platform.

In one aspect, a mixed-media module provided herein serves as a gateway to additional information (e.g., information of vendors or stakeholders such as commercial web sites for the vendors or stakeholders). Any vendors or stakeholders, directly or indirectly associated with the content of a mixed-media module, can be used in embodiments described herein. For example, a mixed-media module of "Tokyo," can include information of hotels, stores, museums, travel agencies, airlines, places of interests (e.g., hot springs), hospital.

Figure 8A:
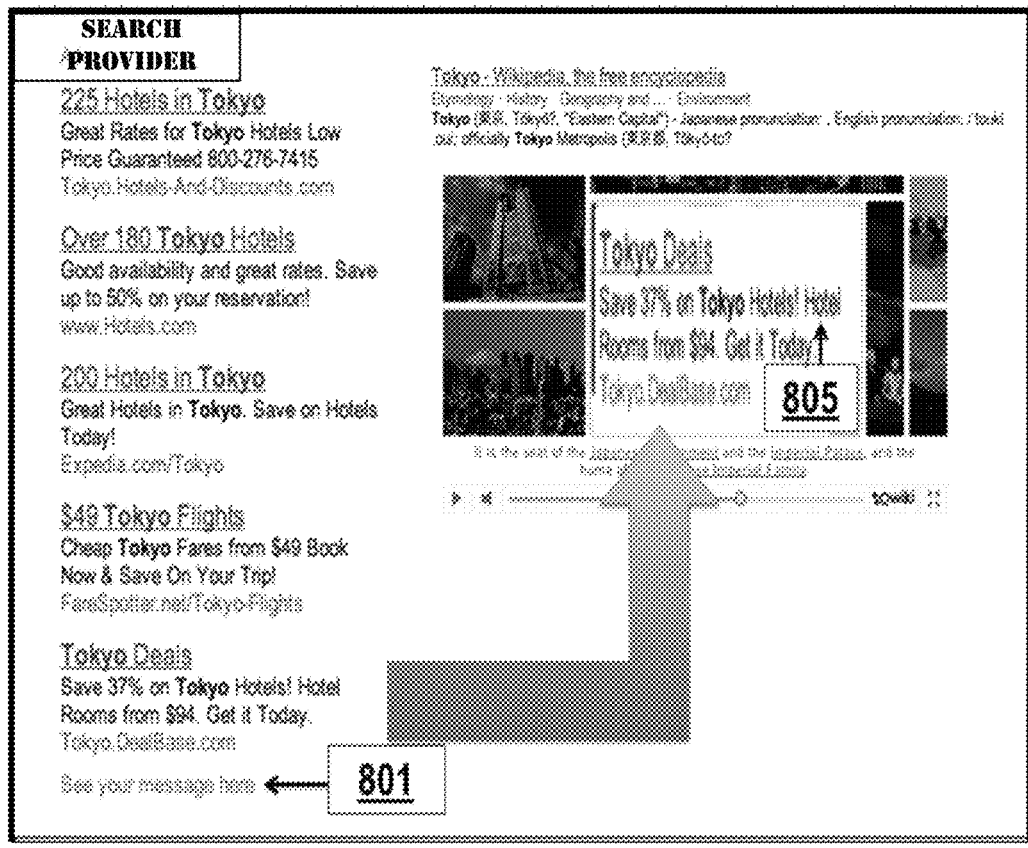
FIG. 8A is an example showing ad placement in an implementation consistent with certain aspects related to the innovations herein.
Figure 8B:
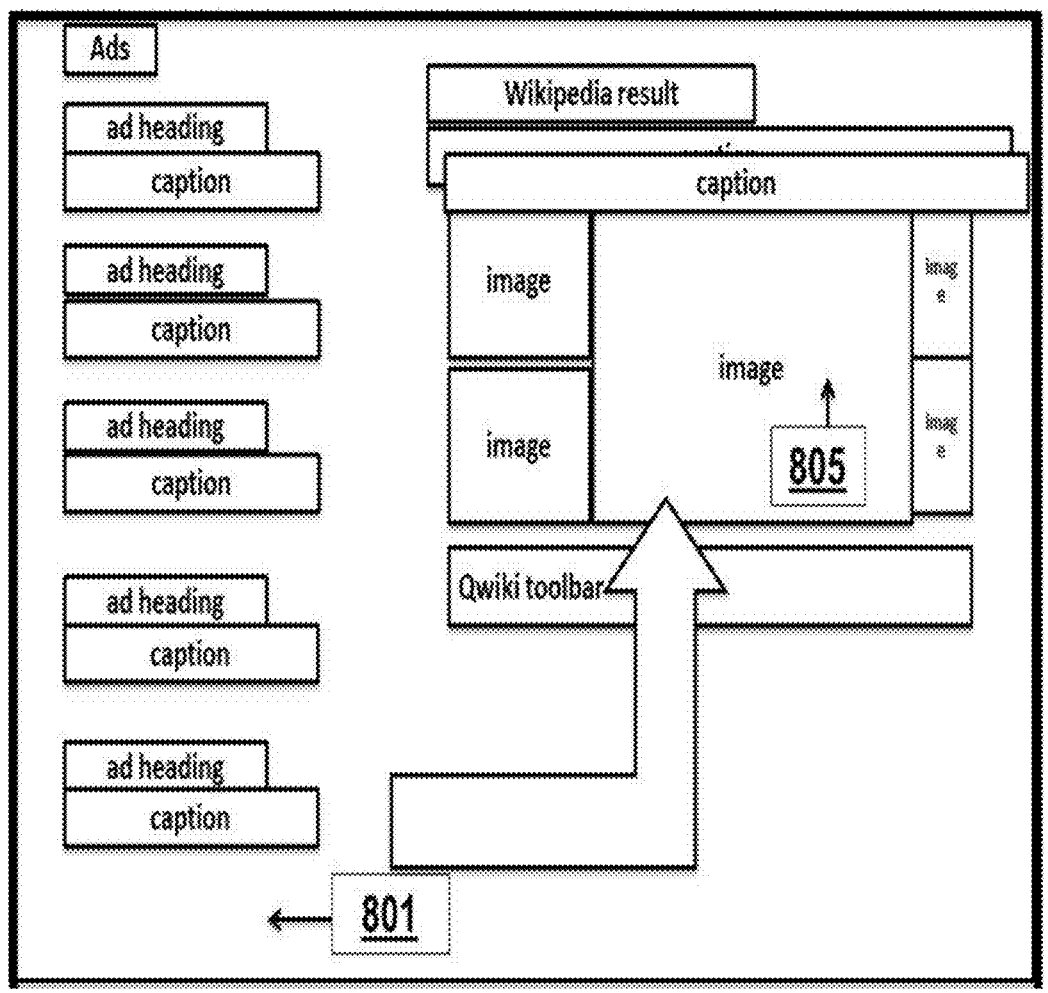
FIG. 8B is block diagram of FIG. 8A consistent with certain aspects of the innovations herein.

FIG. 8A is an example showing illustrative ad placement 801 features, consistent with aspects of the innovations herein. The integration of mixed-media module interactive summaries into a SERP creates additional advertising monetization units, these units can be presented as interactive captions on the CPC/PPC (Cost Per Click/Pay Per Click) advertisements that traditionally are placed alongside search results, or the CPC/PPC ads (and other promotional units) can be placed within the mixed-media module itself, as shown in FIG. 8. For example, the interactive summary can be presented as a caption on the CPC advertisement that are traditionally placed alongside organic search results 801. In some implementations, the CPC ads can be placed within the multimedia presentation or mixed-media module 805, itself.

It should be noted that FIG. 8 may give the appearance that the CPC ad is loading within the Wikipedia result. However, implementations may include the CPC ad displaying its own mixed-media module. Loading the CPC ad into the Wikipedia mixed-media module is a different embodiment from such implementations.

As described hereinabove, a mixed-media module presents information with removed or reduced redundancy. Therefore, it is possible to include more diverse information in a mixed-media module, which makes advertising via a mixed-media module more efficient. For example, a mixed-media module concerning "Tokyo" may include advertising information of different hotels (e.g., FIGS. 8A and 8B) where a user can browse a list of hotels (e.g., elements 801) and select one or more to view in detail (e.g., element 805). The same mixed-media module concerning "Tokyo" can include additional and relevant advertising information of restaurants, stores, museums, and places of interests (e.g., hot springs). As such, it is possible to include more diverse, more detailed advertising information from numerous types of vendors or stakeholders. In addition, relevant information although not directly associated with the content of a mixed-media module, such as sites for purchasing travel tickets can also be presented in a mixed-media module concerning "Tokyo."

In some embodiments, information of the vendors and/or stakeholders is determined based on the preference or profile or a particular user. For example, a user can permit a mixed-media module content provider to access a personalized profile of the user. In some embodiments, one or more mixed-media modules are generated dynamically as results, for example, on a local device or a remote server, in response to a search term. In some embodiments, one or more mixed-media modules are identified among a library of pre-existing mixed-media modules on a remote server. In some embodiments, a combination of one or more dynamically generated mixed-media modules and one or more identified pre-existing mixed-media modules are provided as results in response of the search term entered.

In some embodiments, a functionality is used to identify whether a personalized profile exists for the user entering the search term. In embodiments where such a profile does not exist, search results (e.g., one or more dynamically generated mixed-media modules, one or more identified pre-existing mixed-media modules, and/or a combination thereof) are provided to the user. In embodiments where such a profile exists, search results (e.g., one or more dynamically generated mixed-media modules, one or more identified pre-existing mixed-media modules, and/or a combination thereof) are modified before being provided to the user. In such embodiments, information of vendors and/or other stakeholders is dynamically added to relevant content in a mixed-media module in the search results, which include, e.g., one or more dynamically generated mixed-media modules, one or more identified pre-existing mixed-media modules, and/or a combination thereof. In some embodiments, multiple pieces of information of vendors and/or other stakeholders are dynamically added to relevant content in a mixed-media module in the search results.

Figure 8C:
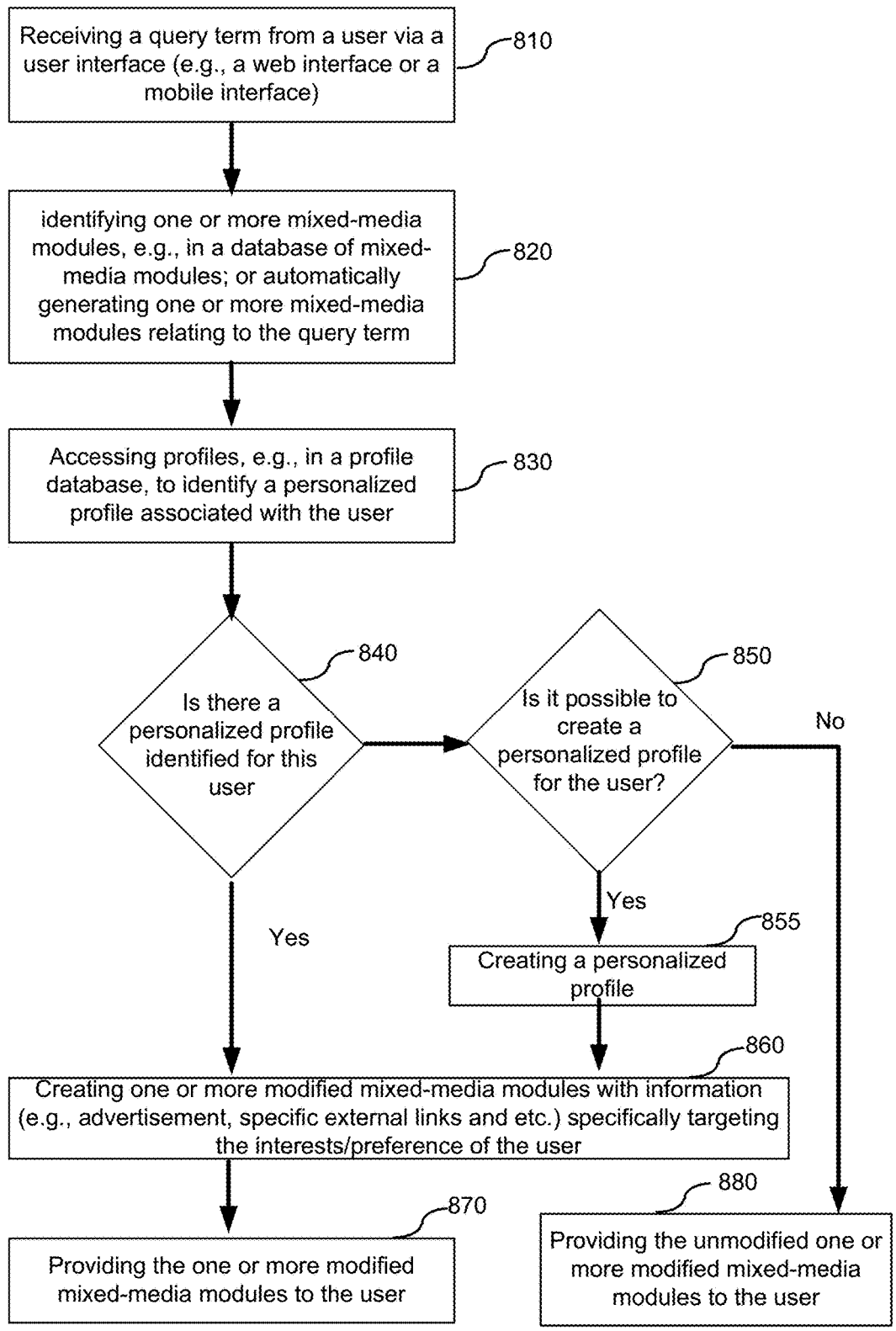
FIG. 8C is block diagram depicting an exemplary process for creating an Ad layer to the mixed-media module.

An exemplary process for adding an Ad layer to an existing mixed-media module is depicted in FIG. 8C. In some embodiments, mixed-media modules with different types of advertisement information and/or other stakeholder information are pre-created and categorized in one or more database on a remote server. In some embodiments, mixed-media modules with different types of advertisement information and/or other stakeholder information are created on-the-fly based on recent or real time activities of a user. For example, hotel information will be provided if the user has previously search hotels before submitting the query "Tokyo."

A personalized profile is loosely defined; it can be created/identified based any information/preference/interests/tendency/trend in activities that are associated with a user. In some embodiments, the personalized profile includes search preferences of the user; e.g., created by tracking the search activities of the user; by providing the means/user interface for the user to enter such information; by tracking the user's interest list on a website such as Yahoo!, Facebook, Google, Twitter, or Tumblr; or by importing an existing preference profile of the user from on a website such as Yahoo!, Facebook, Google, Twitter, or Tumblr. In some embodiments, the personalized profile includes one or more search results from the user. In some embodiments, the personalized profile includes one or more people, one or more topics, or one or more events, associated with the user; for example, the list of people the user follows on Twitter.

In some embodiments, a personalized profile can be created by providing an interface for the user to select or enter information concerning the user's preference or interests. For example, a fillable form or an interface where listings of interests/preferences are provided and a user can select particular interest/preference by check a corresponding box.

In some embodiments, a personalized profile is used to suggest content, including possible mixed-media modules that are of interest to the particular user. This capacity is particular important to content provider and distributor. For example, a personalized profile includes the user's interests/preference in news or other types of content. More specifically, a user can have a preference for technology news (e.g., following one or more types of technologies; one or more types of industries; and/or one or more companies), political news, or news from one or more selected geographical regions. In some embodiments, one or more mixed-media modules are provided to a user, not in response to a search term, but as part of the preferred content on a portal for the user; for example, a personalized Yahoo! Page such as My Yahoo! In such embodiments, the user logs into the portal page via an authentication module and a personalized profile can be created for the user. For example, the user can be provided with an interface through which to select specific topics of interest that will be included and saved in the personalized profile. The content provider/distributor then provides/distributes specific content targeting the user based on the personalized profile.

A mixed-media module as an advertising tool offers many advantages. For example, a mixed-media module offers more diverse and more interesting content compiled using multiple media formats. Also, a mixed-media module has enhanced and superior advertising capacity—with the SERP of a mixed-media module, each component in the layout can be used as a platform for advertisements—thus making it possible to promote multiple types of vendors and/or stake holders at the same time. In some embodiments, different positions are auctioned or offered to vendors and other stakeholders. For example, a top Italian restaurant may pay to obtain a prominent ad spot (e.g., near the beginning of a mixed-media module) among mixed-media module search results that are provided in response to a "San Francisco Italian restaurant" query.

Figure 8D:
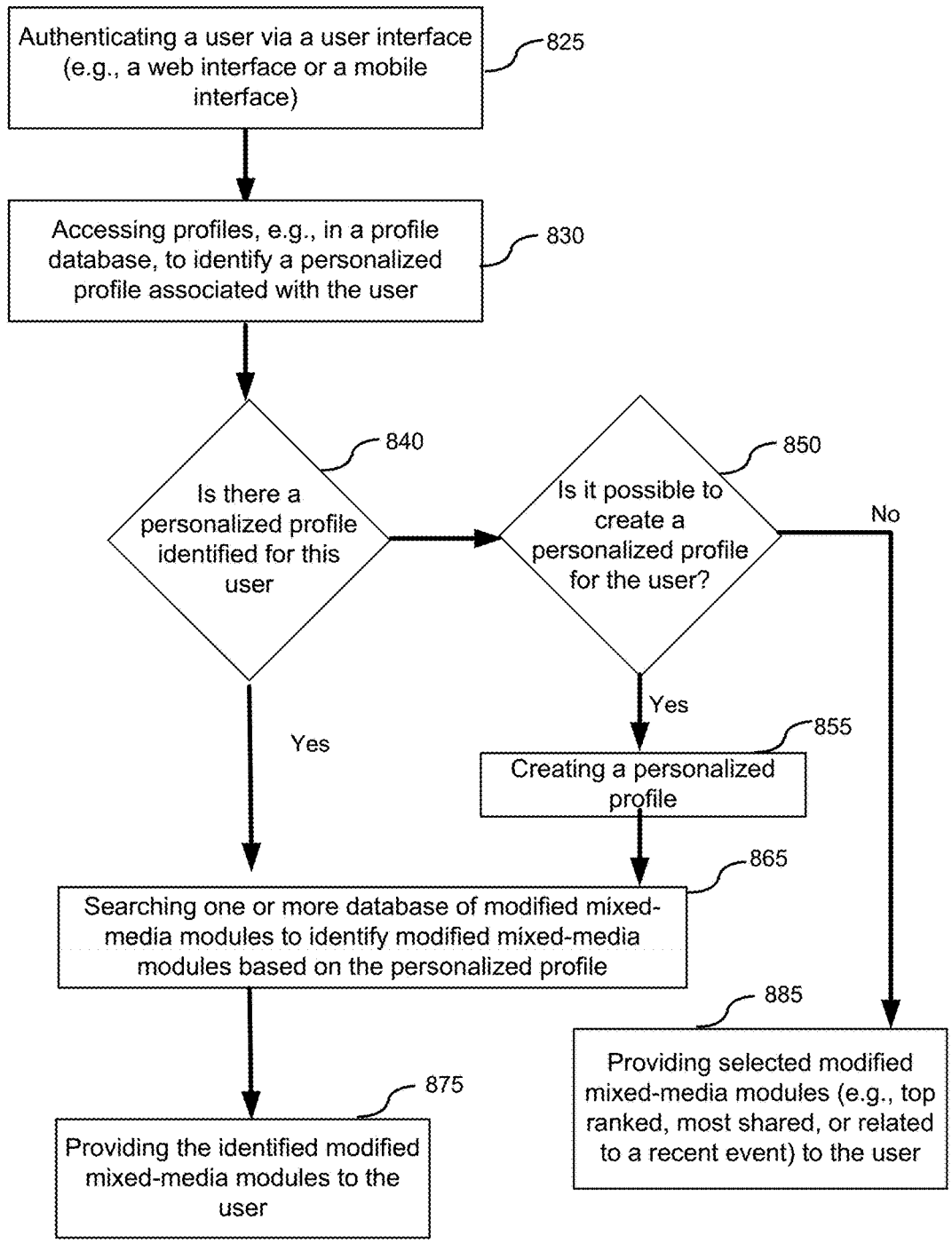
FIG. 8D is block diagram depicting an exemplary process for providing mixed-media module with targeted content.

In another illustrative embodiment, as illustrated in FIG. 8D, one or more mixed-media modules are created uniquely for each user. The process may begin at step 825 where a user navigates to a web site, such as a web portal, including a login interface where the user enters their credentials and is authenticated. Once logged in, at step 830, access to a personalized profile is made. The user is identified by the system with a corresponding personalized profile retrieved from a profile database that includes any number of user defined settings. For example, the user profile may include user input data regarding their name, hobbies, likes, dislikes, web portal preferences, contact information, friends, purchases, application information, language, posts, tweets, and the like. Other user profile information may include social network connections such as the people a user follows on Twitter or on other social media networks. The user profile may also include information collected while the user is logged into the web portal, but not transparent to the user, such as information related to their usage on web sites, user search history and so forth. Together, this user profile includes data that are actively collected directly from the user, and passively collected based on user activity.

A determination is made at step 840 of whether a personalized profile is exists for the authenticated user. If not, and it is determined at step 850 that it is not possible to create a personalized profile (if a user declines or opts out), then at step 885, the mixed-media modules that are selected for presentation to a user will be based on criteria other than the personalized profile. For example, the top ranked, most shared or most recent mixed-media modules may be provided to a user at step 885.

However, when no personalized profile exists, but it is possible to create a personalized profile, then a user creates a personalized profile at step 855. Once the personalized profile is created or retrieved, mixed-media modules are searched for and identified based on the personalized profile at step 865. Mixed-media modules may also be created in real-time in the case of a breaking news story, or updated information based on the personalized profile. For example, a user profile may indicate strong interest in a music group such that a plurality of databases are searched for content and mixed-media modules related to the music group for presentation to the user. If a new announcement is made by the group, a new mixed-media module is dynamically generated based on the user's declared interest for the music group and the group's new announcement. Other users with the same interests may also be presented the dynamically generated mixed-media module. The databases searched are not limited to those in which the user is logged into, but may be any database include those containing previously created mixed-media modules, user-created mixed-media modules, and dynamically generated mixed-media modules.

At step 875, the identified modified mixed-media modules are provided to a user, and may even include a byline with the user since the mixed-media module is formed based on the user's personalized profile. In this manner, users of different profiles are provided mixed-media module content that will most likely engage each user, thereby promoting user dwell time within a web portal.

Moreover, mixed-media modules that are created are stored and indexed in a database for use by the web portal and/or search engine crawlers. The indexing may be based on the metadata within the mixed-media module. The mixed-media module that is richer in content for a given topic may then easily become integrated into search engine results for the user and others. The real-time, in-depth and information rich mixed-media module improves upon user's ability to search for and process information.

In another implementation, information/news event determined to be of high public value as determined by any of popularity, ranking, government notice, or other criteria are dynamically generated and presented to users. For example, an earthquake that occurs has widespread and immediate effects on a population, and may be automatically generated based on updated information retrieved from the USGS. Those users living within or near the geographic area, or users otherwise having a connection to the area within the earthquake radius are presented with a mixed-media module related to the earthquake. The mixed-media module may include detailed information regarding the earthquake, but may also include public service information relevant to public safety, such as links to shelters, traffic alerts, and other relevant topics. In this manner, the mixed-media module provides public notice to important events.

Mixed-media modules may also be generated for other types of emergency events such as natural disasters and terrorist attacks, or other ongoing criminal activity (i.e. Amber Alert). The users who receive these mixed-media modules may be limited, for example, users in Alaska may have no need to receive a mixed-media module related to a tornado in the Midwest. However, if the user profile indicates that the user in Alaska has family from the Midwest, then that user may receive a mixed-media module related to helping the victims of the tornado, as one non-limiting example.

Referring now to FIGS. 9-14, implementations herein with mixed-media module integrations involving video can yield improved/higher quality on mobile devices, consistent with aspects of the innovations herein. In one illustrative implementation, for example, there is provided a method of processing search information comprising returning search results in a search results page including one or more pre-prepared narrative multimedia presentations. The example method could also include providing at least one integrated multimedia presentation selected by a user. And, also, providing access to at least one of additional third party information, sites, content, applications and other multimedia. Further, the example method could include wherein, the multimedia presentations are configured in association with other features for low-bandwidth (e.g., non-rendered, etc.) display for use on a mobile device.

Also, given the flexible and non-rendered nature of the mixed-media modules, streaming and picture quality can be easily optimized for specific mobile devices. Further, such implementations allow ease of interactions by providing a standard universal layer for interactivity. In other embodiments, systems and methods herein may include features and implementations involving interactive and coordinated hyperlinks for deeper exploration of the content within the video—this feature of coordinating links/content inside of the mixed-media module interactive summary allow new attribution and monetization capabilities by content creators and search engines utilizing the underlying model(s).

Here, it should be noted that a "mobile device" can be any kind of smartphone, tablet computer, laptop, notebook, or any kind of similar device. These devices are typically touch screen enabled and retain internet connectivity through either a shorter range radio such as those used in WiFi technologies, or through cellular telephone connections, or both. The device may connect to the internet in any fashion.

Figure 9:
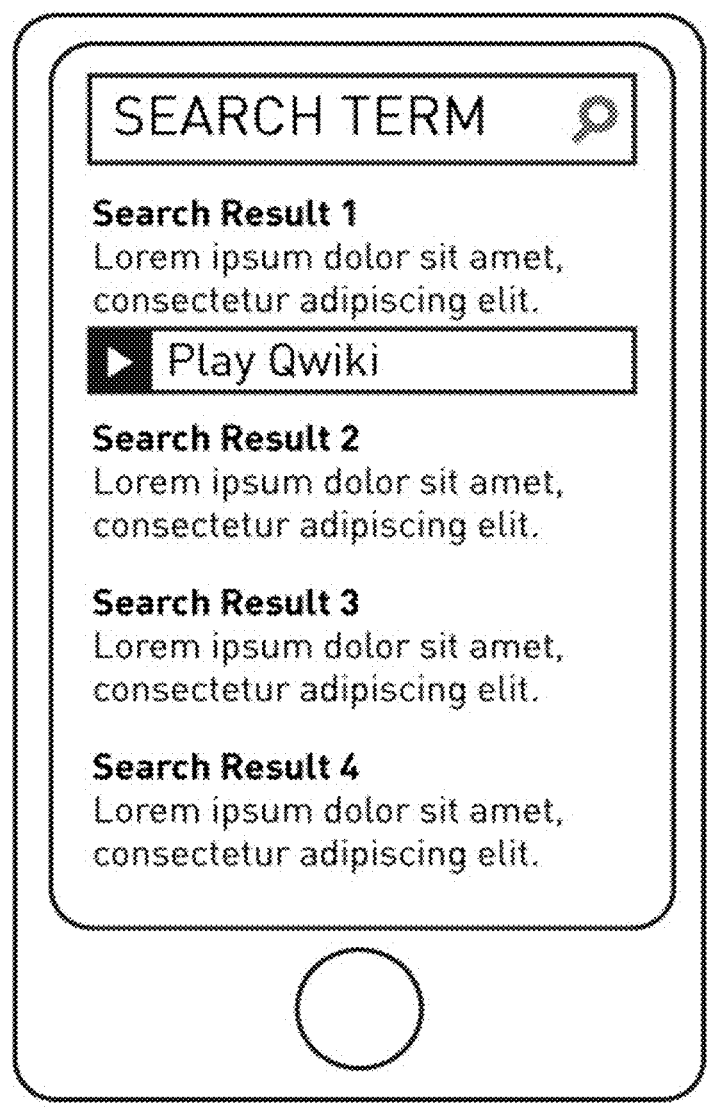
FIG. 9 is an exemplary screenshot showing an illustrative mobile device display including a search engine results page with integrated mixed-media component consistent with certain aspects related to the innovations herein.

FIG. 9 depicts an illustrative SERP with mixed-media module implementation formatted for a mobile smartphone or tablet computer, consistent with aspects of the innovations herein. As shown, for example, an illustrative "Play Qwiki module" icon is shown directly beneath the first search result in the search result screen.

Figure 10:
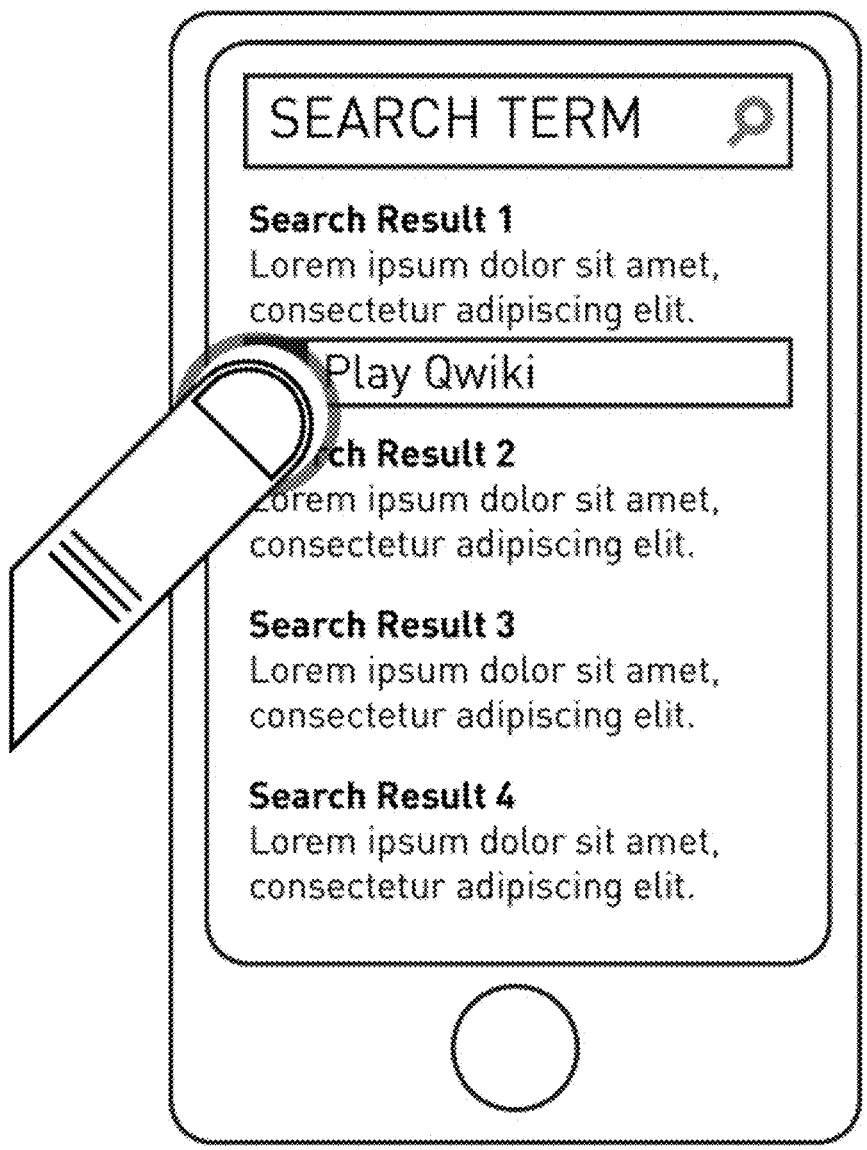
FIG. 10 is an illustration of an exemplary search engine results page showing user action with a mobile device display search results page consistent with certain aspects related to the innovations herein.

FIG. 10 is an illustration of a search engine results page with the integration of touch-enable functionality consistent with aspects of the innovations herein. In FIG. 10, a user is shown tapping the "Play Qwiki module" icon using a finger. Touch enabled screens allow such interaction with a stylus or other such device as well, while such features may be navigated with various cursor-based functionality, as well.

Figure 11:
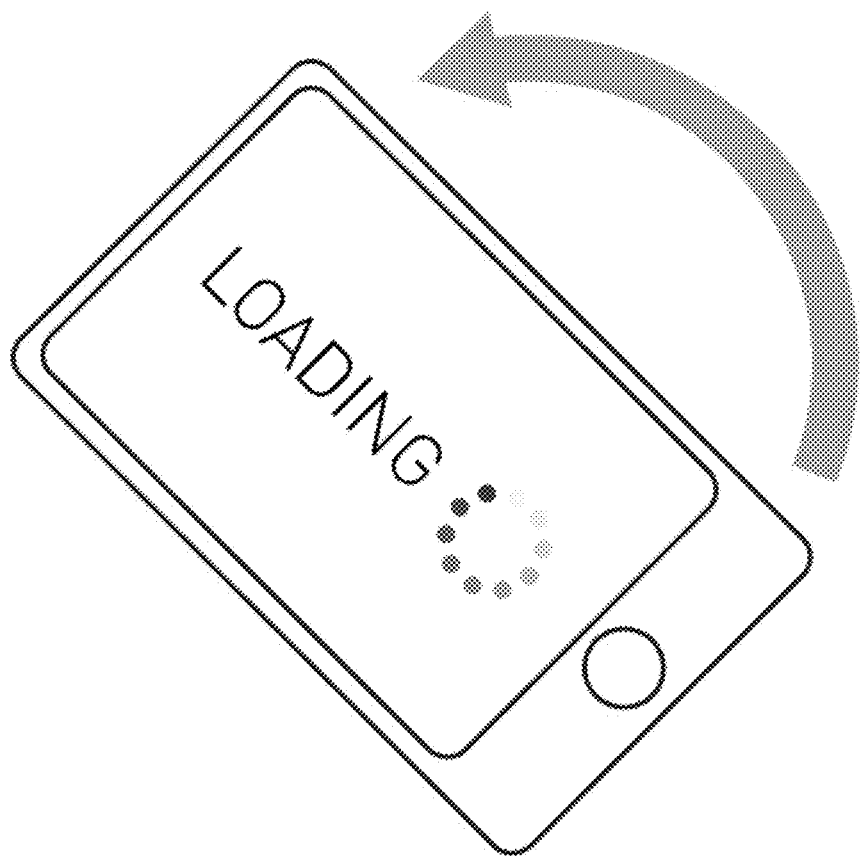
FIG. 11 is an exemplary screenshot illustrating further mobile device display functionality consistent with certain aspects related to the innovations herein.

FIG. 11 is an illustration of exemplary mobile device display and functionality consistent with aspects of the innovations herein. In the example in FIG. 11, the mobile smartphone may be rotated to initiate a specified function associated with the SERP or just to allow for a landscape display, instead of a profile display.

Figure 12:
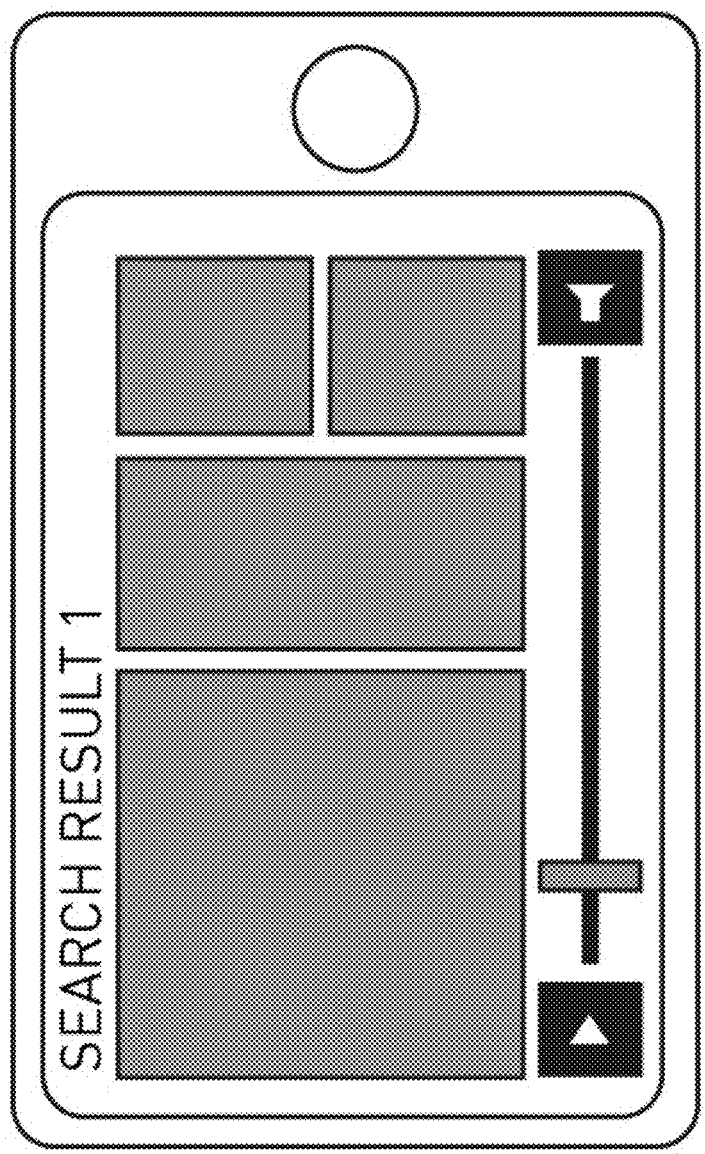
FIG. 12 is an exemplary screenshot illustrating mobile device display of a search results content such as a mixed-media module consistent with certain aspects related to the innovations herein.
Figure 13:
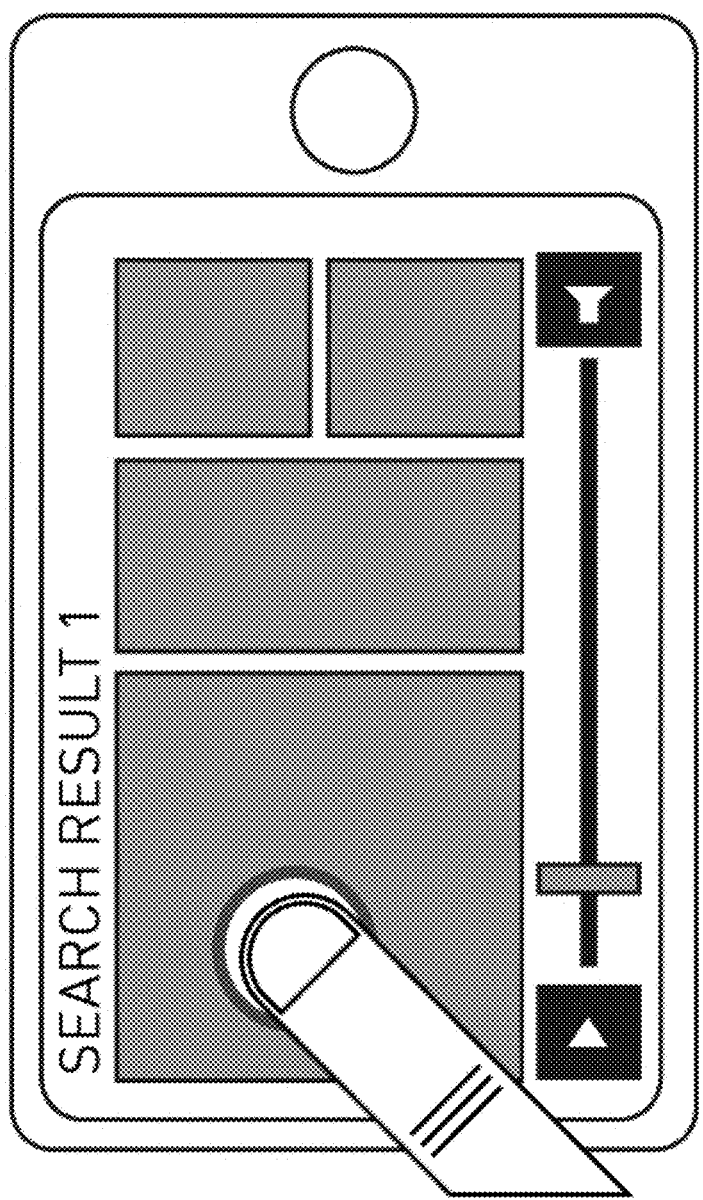
FIG. 13 is an exemplary screenshot of an illustrative mobile device display showing user interaction with a mixed-media module from the search results consistent with certain aspects related to the innovations herein.

FIG. 12 is an exemplary screenshot illustrating mobile device display of a search results content such as a mixed-media module consistent with certain aspects related to the innovations herein. FIG. 13 is an exemplary screenshot of an illustrative mobile device display showing user interaction with a mixed-media module from the search results consistent with certain aspects related to the innovations herein. FIG. 13 shows a user interacting with a portion of the mixed-media module, here tapping the particular media or object with respect to which additional content (details, information, etc.) or further functionality ("re-query", etc.) is desired. As set forth elsewhere herein, the search engine may be configured to interoperate with such action in a variety of ways.

Figure 14:
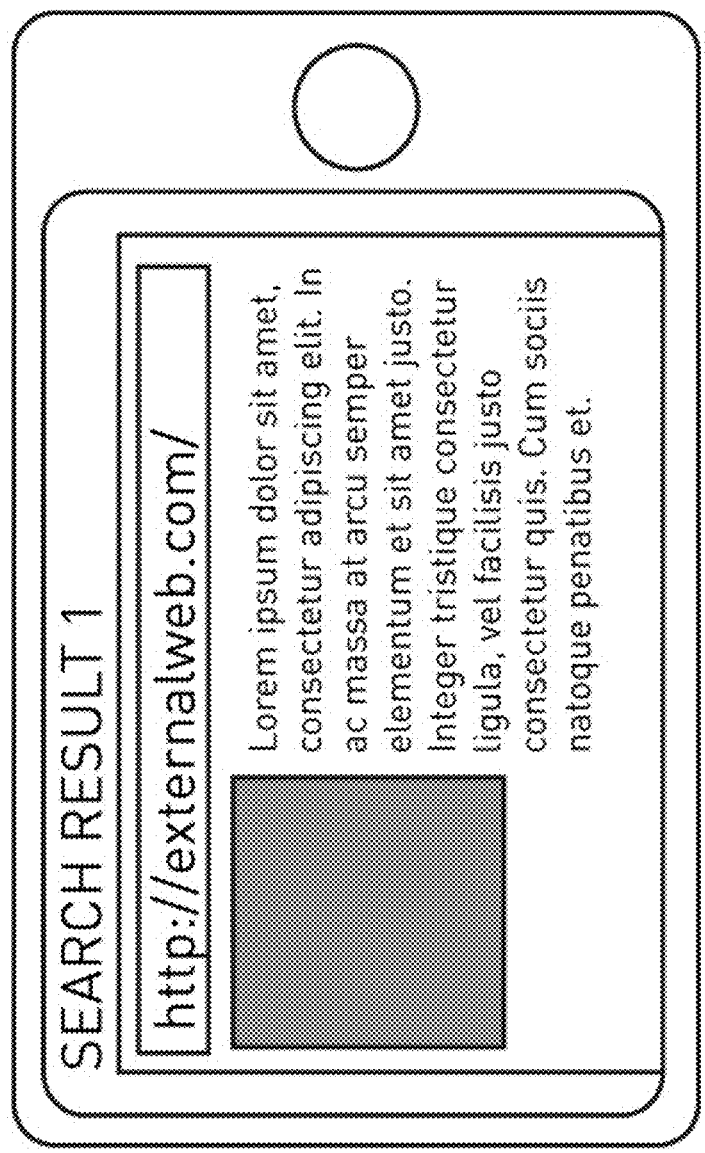
FIG. 14 is an exemplary screenshot of a mobile device display showing an illustrative result of a user interaction consistent with certain aspects related to the innovations herein.

FIG. 14 is an exemplary screenshot of a mobile device display showing an illustrative result of a user interaction consistent with certain aspects related to the innovations herein. Here, this example shows an illustrative re-direct associated with the tapped object to a particular web page. The result shows a multimedia text and image or video within the web page.

Various aspects of the innovations involving utilization of mixed-media modules, as may occur in certain search contexts, are next described. In some implementations, for example, integration of such mixed-media modules into search results may include features of parsing unstructured data into structured meta data, and selecting media to be displayed.

Further, in some of the illustrative (non-limiting) examples shown and described herein, search-related innovations may involve classification features and/or obtaining a common identifier in connection with mixed-media module processing, whereas other implementations may use a data source tied to the base reference or article, for example, from Wikipedia, etc., directly. To facilitate auto-generation features, some implementations may also involve processing mixed-media modules through an input file generator process, which may generate an input file for subsequent processing and determinations regarding the mixed-media modules. Such determination(s) may include running through a classifier (with criteria) to verify suitability. Implementations may then publish or otherwise distribute mixed-media modules that satisfy the criteria.

The implementations immediately above may also include or involve features of parsing unstructured data into structured meta data and media selection. For example, such features may include innovations relating to detecting entities in text such as people, places, things, etc. in text.

According to some implementations, auto-generation and near real-time mixed-media module searches and receiving structured data in general may be realized by running a script on an information provider/server. Such implementations may obtain structured data, such as to run script on e.g. Wiki re: updates, including obtaining the data from a set artifact/article, such as one that involves structured data. It may then generate the mixed-media module as a function of the structured data. Next it may publish a structured-data mixed-media module on the website/venue such as a search provider, upon approval of satisfaction of criteria. The features of parsing unstructured data into structured meta data, and selecting media see may also be included in some implementations. Further, these features can include innovations relating to detecting entities in text such as people, places, things, etc. in text.

Auto generation and near real-time Qwiki™-enable search upon death of an individual may involve features similar to the above, which are configured as a function of structured data, but specific to death of an individual.

Here, for example, implementations may first obtain a list of one or more dead people such as to run script on an information provider server, e.g. Wiki re: death updates, and gets this from the artifact/article, wherein structured through data: full name, age, precise moment of death, etc. Subsequent steps may include auto-generating a mixed-media module regarding the dead person, then publish a death notice mixed-media module on the website/venue such as, for example, a Search provider, upon completion of an approval process of satisfaction of criteria. Again the features of parsing unstructured data into structured meta data, and selecting the media to be shown may also be included in some implementations. Further, these features can include innovations relating to detecting entities in text, for example, people, places, things, etc in text.

Illustrative examples of some but not all implementations above are shown in FIGS. 15A-17. The following are further set forth in the code Appendix of U.S. provisional patent application No. 61/658,909, which is incorporated herein by reference in entirety.

Figure 15A:
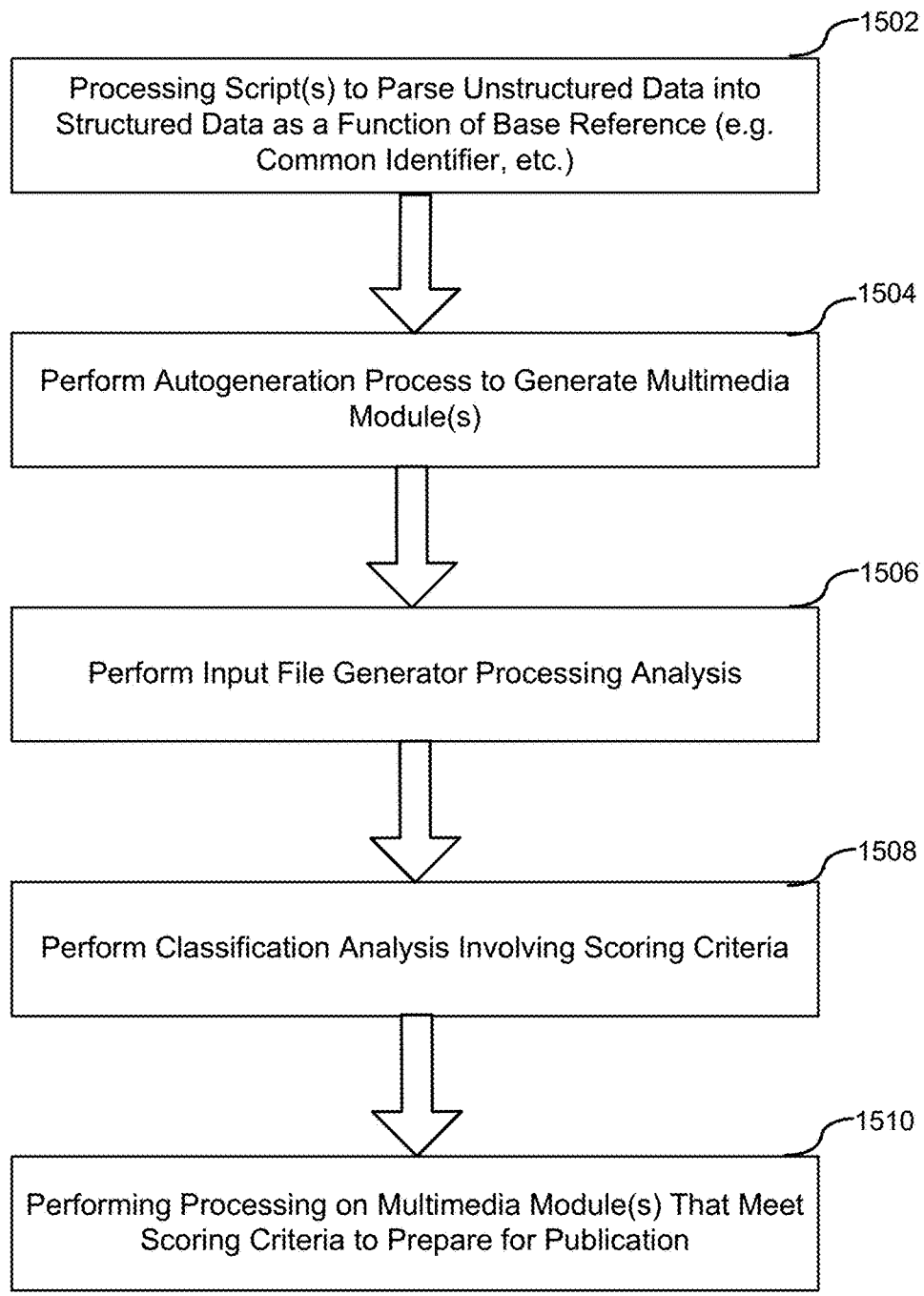
FIG. 15A is a flow chart showing an exemplary method associated with illustrative search/mixed-media module processing consistent with certain aspects related to the innovations herein.

FIG. 15A shows an example flow chart including steps for processing script(s) to parse unstructured data into structured data as a function of base reference 1502 (e.g. common identifier, etc.). Next, a step of performing an autogeneration process to generate multimedia module(s) 1504 may be performed. Autogeneration is performed by storyboarding the metadata based on a predetermined criteria, such as search engine rankings or search engine index, for example. The form, function, size, length, speed and other aspects of the presentation of the multimedia module are variable and may be predetermined. Then, an input file generator processing analysis 1506 may be performed. A step of performing classification analysis involving scoring criteria 1508 may then be performed. These steps add or update a search provider indexing system to improve further search queries. Further, performing processing on multimedia module(s) that meet scoring criteria to prepare for publication 1510 may occur. In one implementation, the multimedia module is presented to another user for review prior to publication.

In one illustrative implementation, a user inputs a search query into a web-based browser such as a search engine. The base reference, for example, corresponds to the search query. An analysis is then performed on the search query for real-time or near real-time updated information related to the search query from any number of databases. The type and number of databases searched is not limited to, but may include Wikipedia, news websites, social media networks, advertiser content, user-generated content, etc. For example, if the search query is related to a celebrity, the real-time updated information may be related to the celebrity's most recently updated activity. If the search query is related to a sports team, the real-time updated information may be related to the team's last game, in-game summary, etc. Other search queries may relate to a news event, such as a natural disaster, crime, etc. An example of a celebrity related search query, such as a celebrity death, is described below with respect to FIG. 16B.

The data from the database sources is initially unstructured, but are processed/parsed based on their relevance to the search query and formed into metadata. The metadata is then used to generate an interactive multimedia module. Metadata may include, but is not limited to text, image, video, audio, document, text entry, interactive icon, etc. The multimedia module is not necessarily interactive in some implementations. Once generated, the multimedia module is published on a server such as a search engine, social network, website or database. The interactive multimedia module may be shown as a search result within a search engine results page in response to the input search query from the user. In some implementations, verification is performed of the accuracy of the real-time updated information prior to publishing the multimedia module.

The metadata and the characteristics of the multimedia module may be based on predetermined criteria, such as popularity and/or those determined by an advertiser. The databases, unstructured data and metadata may also be ranked based on a user profile, user search history, user preferences, user customization, social network connections, and advertiser. For example, user search history may indicate that a user frequently visits only a handful of websites, for which metadata parsed from those sites is ranked higher than metadata from other websites. Similarly, the databases may be selected based on a user search history.

The metadata is then storyboarded to generate the multimedia module. The metadata may also be used to update a search engine index.

Figure 15B:
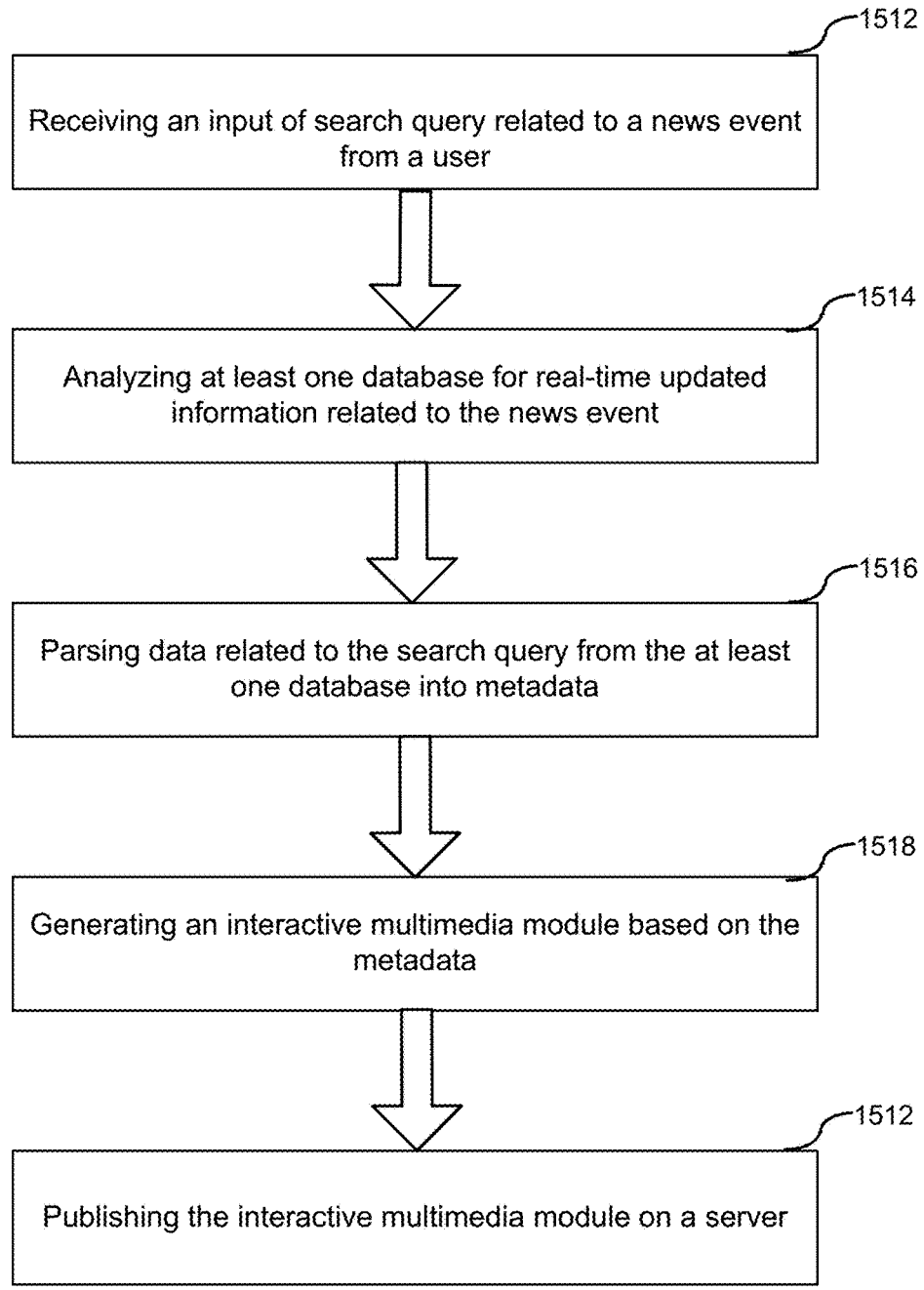
FIG. 15B is a flow chart showing an exemplary method associated with illustrative search/mixed-media module processing consistent with certain aspects related to the innovations herein.

In one illustrative implementation (e.g., as depicted in FIG. 15B, steps 1512 through 1520), an input of a search query related to a news event from a user is input. Then, at least one database is analyzed for real-time updated information related to the news event. Data related to the search query is parsed from the at least one database into metadata. An interactive multimedia module is generated based on the metadata. The interactive multimedia module is generated on a server.

Figure 16A:
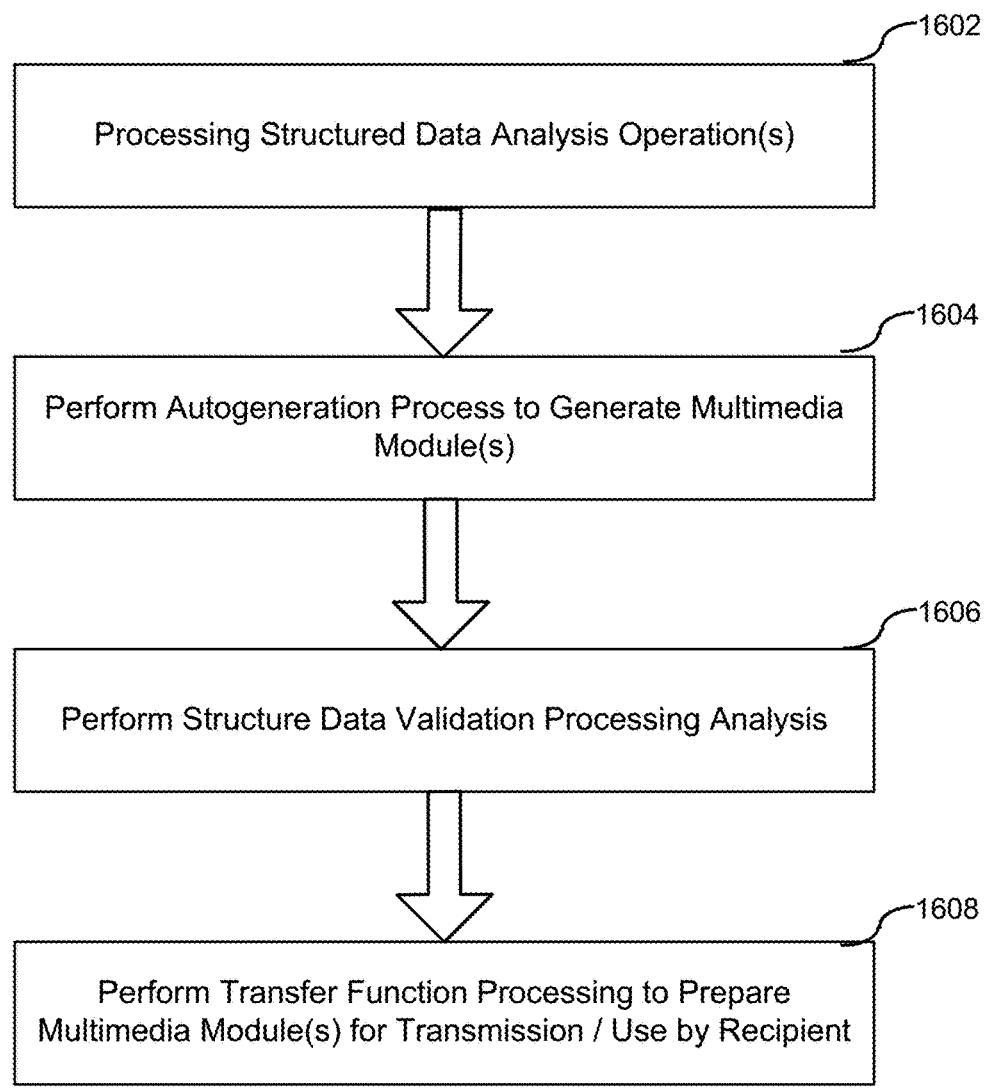
FIG. 16A is a flow chart showing an exemplary method associated with illustrative search/mixed-media module processing consistent with certain aspects related to the innovations herein.

FIG. 16A shows example steps including processing structured data analysis operation(s) 1602. Then, performing an autogeneration process to generate multimedia module(s) 1604. Next, performing a structure data validation processing analysis 1606. Finally, performing transfer function processing to prepare multimedia module(s) for transmission/use by recipient 1608.

Figure 16B:
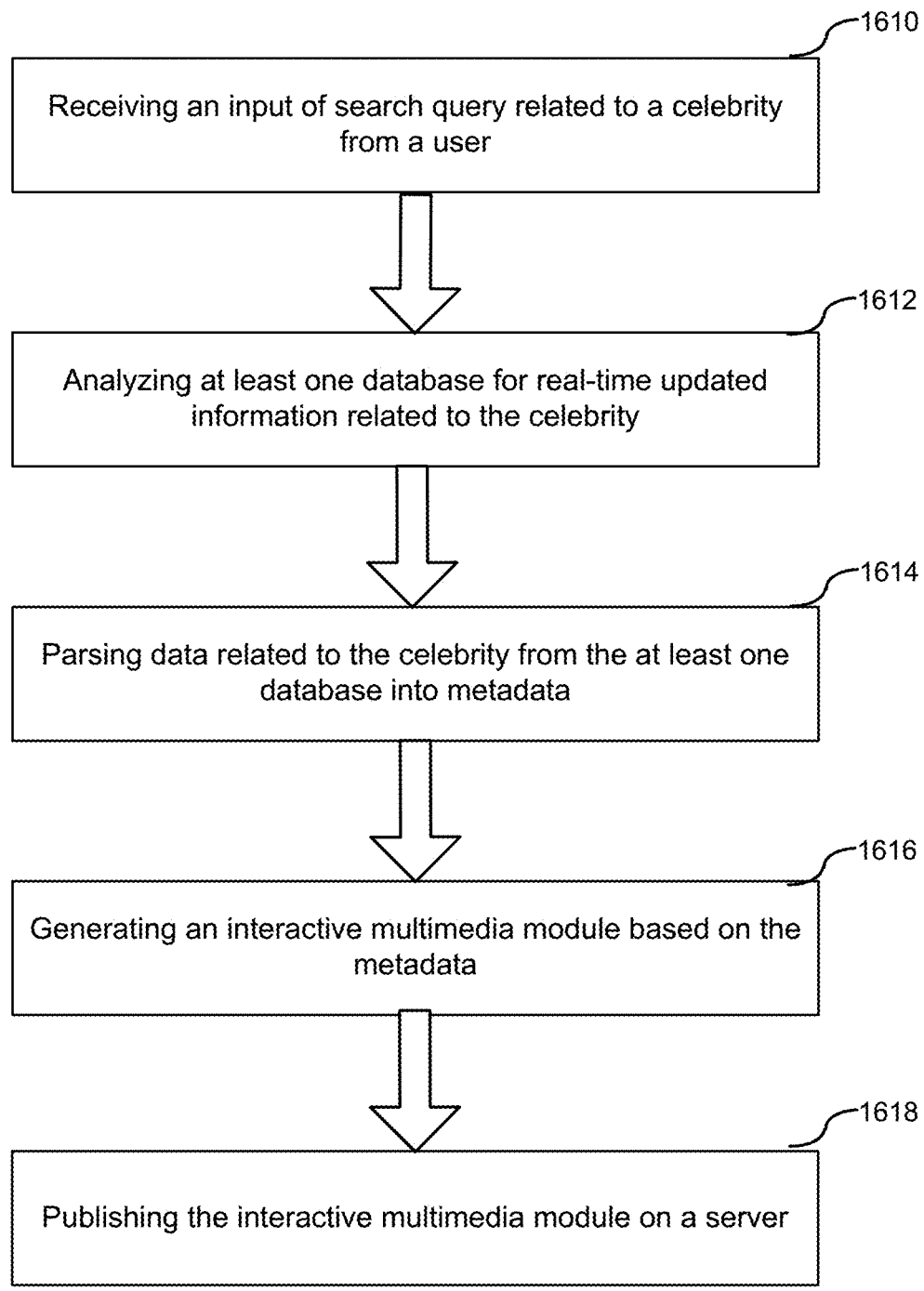
FIG. 16B is a flow chart showing an exemplary method associated with illustrative search/mixed-media module processing consistent with certain aspects related to the innovations herein.

In one illustrative implementation (e.g., as depicted in FIG. 16B, steps 1610 through 1618), a user inputs a search query regarding a death of a person or a person's name at step 1610. The person may be, for example, a celebrity. Then, at least one database is analyzed for real-time updated information related to the person (i.e. their death) at step 1612. The real-time updated information may include biographical information including a name, an age, a moment of death, and life of the deceased at step 1614. The real-time updated information may be added to the metadata and presented within the multimedia module at step 1616. Data related to the person is parsed from the at least one database into metadata. An interactive multimedia module is generated based on the metadata. The interactive multimedia module is generated and published on a server at step 1618.

Figure 17A:
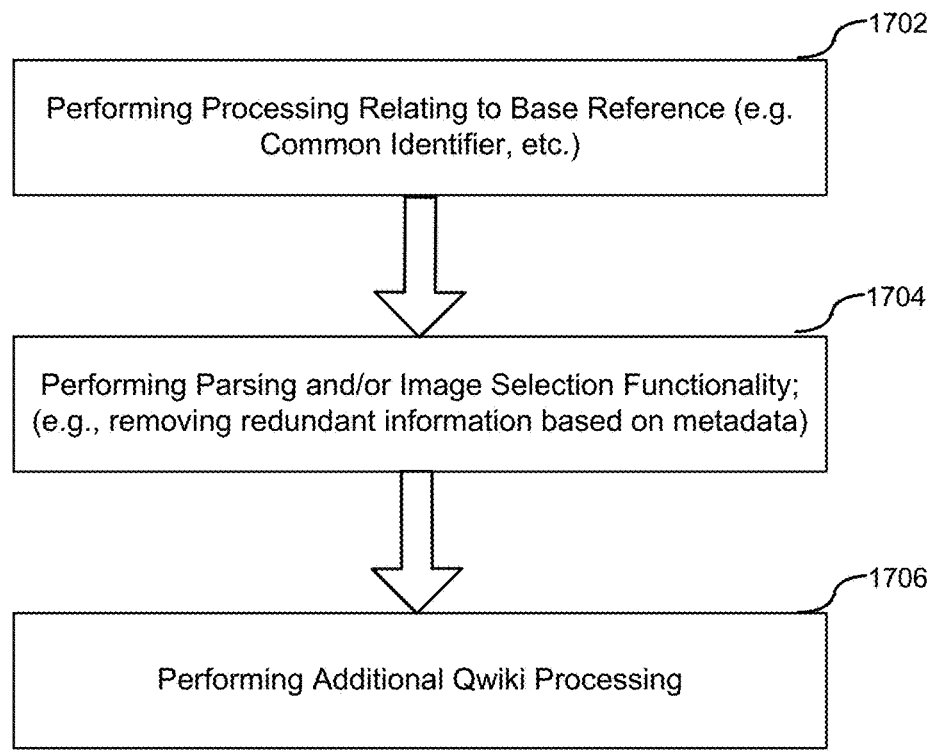
FIG. 17A is a flow chart illustrating exemplary steps associated with performing parsing and image selection consistent with certain aspects related to the innovations herein.
Figure 17B:
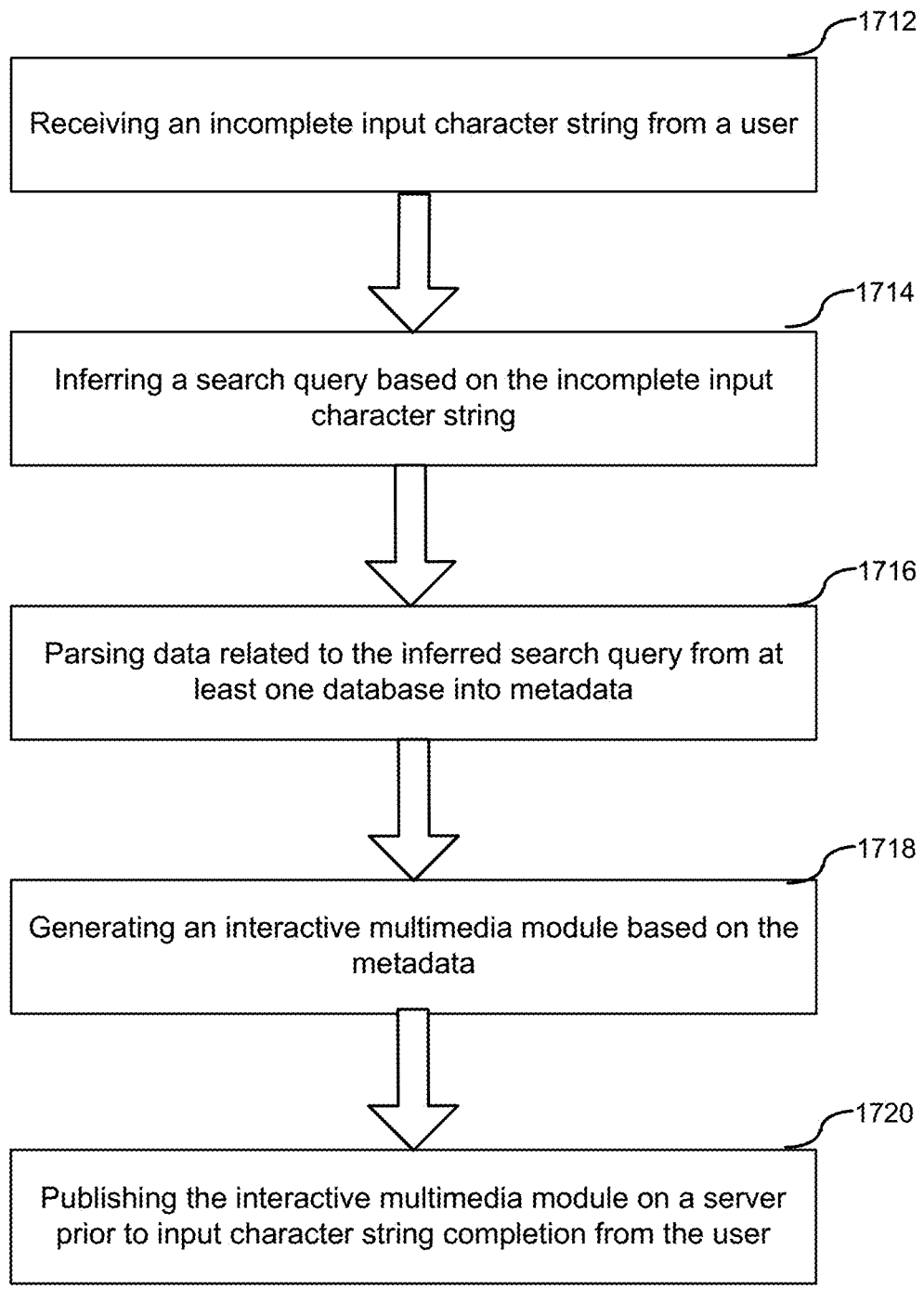
FIG. 17B is a flow chart illustrating exemplary steps associated with an exemplary embodiment of the autofill functionality consistent with certain aspects related to the innovations herein.

FIG. 17A is a flow chart illustrating steps for performing parsing and image selection. In some example implementations, such features may be innovative on their own. As set forth, some implementations may involve features including innovations relating to detecting entities in text such as people, places, things, etc. Turning back to FIG. 17A, an illustrative method may include performing processing relating to base reference (e.g. common identifier, etc.) 1702. Next, performing parsing and/or image selection functionality 1704 may be performed. Finally, performing additional processing associated with formation of the mixed-media module 1706 may also be performed. In one illustrative implementation, duplicate metadata parsed from different databases are removed such that any multimedia module generated will not present duplicate content. For example, metadata parsed from the search query term "Paris" may produce a number of duplicate images of the Eiffel Tower, which would be redundant to present in a multimedia module, thus they are removed prior to publication.

In another illustrative implementation (e.g., as depicted in FIG. 17B, steps 1710 through 1720), the multimedia module may be generated as a user is inputting each input character into a search engine text box. A multimedia module is generated each time a new input character is entered into a text box, even before the user confirms entry by hitting an "enter" or "return" key. Based on the incomplete input character from the user, a search query is inferred and the multimedia module is generated based on the inferred search query, and therafter displayed to the user. For example, an incomplete input character string is received from a user. Then, a search query is inferred based on the incomplete input character string. Data related to the inferred search query is parsed from at least one database into metadata. An interactive multimedia module is then generated based on the metadata. The interactive multimedia module is published on a server prior to input character string completion from the user.

Turning back to more general aspects, an illustrative multimedia presentation herein may be configured as an interactive system of mixed-media/interactive content with clickable components. Various mixed-media modules, here, may also provide a visual confirmation of search results which means less frustration and more productivity for the user. These mixed-media modules may also provide visual relevancy—the multimedia nature of such interactive component provides more in-depth detail of a topic than text alone.

Further, it is noted that pages with multi-media components are often ranked higher in search engine results. In accordance with aspects of the present innovations herein, systems and methods herein provide ways for content creators to provide interactive multi-media content and, in some implementations, improve their search engine ranking through increased meta-data information. The visual nature of embodiments herein also means that such result would not have to be ranked at the very top of an SERP to catch the attention of a search engine user since visual images are more efficiently scanned than text. For online advertisers, better search results will mean greater return on investment. Online ads will be viewed within a more appropriate context and, therefore, more likely to target the right consumers. Interactions with the associated mixed-media modules can also provide additional data to rank pages.

In accordance with aspects of the present innovations, mixed-media module interactive summaries as integrated herein are lightweight—they use less bandwidth than pure video and are a rich, interactive, multi-media experience. Viewing such mixed-media module is faster and easier than video alone because they are interactive and have more discrete sets of contents that can easily be traversed beyond a simple play bar associated with most traditional video. Mixed-media modules herein also contain more information (meta-data) than video because of its multitude of components (mixed media), interactive nature and because of the ability to re-query.

With regard to certain aspects of the innovations herein, another way that implementations herein are an improvement over the traditional search experience, especially from online video, is that that end user does not experience the mixed-media module in a linear fashion. A user can readily jump to different collections of media once a quick scan assures them the preset set of options will not yield the desired results. The user can also choose their path through the content by clicking on hyperlinks (meta-data) within the mixed-media module. This allows the end-user to explore the information that is of the most interest to them, in greater detail and in their preferred format (i.e. text, photos, or video). Innovations herein also work across multiple platforms. For example, mixed-media module interactive components herein can run inside a standard web browser and its player software can be integrated into mobile devices, TV devices, video game units, etc. Further, such mixed-media module(s) may be configured as a universal component across all media and devices.

In accordance with aspects of the present innovations, mixed-media modules herein can act as an "interactive summary/caption" which highlights the curated content from a search result and presents it in narrative form. As such, users may "preview" the contents of the search in an engaging, interactive experience on multiple devices. In certain implementations, an interaction a user may have with the mixed-media module is via "Gestures", such as set forth in connection with FIGS. 18-21. These Gestures may include various touch-screen enabled interactions whereby a user is able to tap, pinch, tap and hold, and swipe or scroll the mixed-media module. Various search engines, servers and/or intermediaries may be configured to respond to or interact in accordance with these Gestures in different ways, such as the examples as described in the Figures and associated descriptions herein. Thus, some implementations herein include methods wherein the interactive multimedia content is configured to allow a new search query and generate a new search results page.

Figure 18:
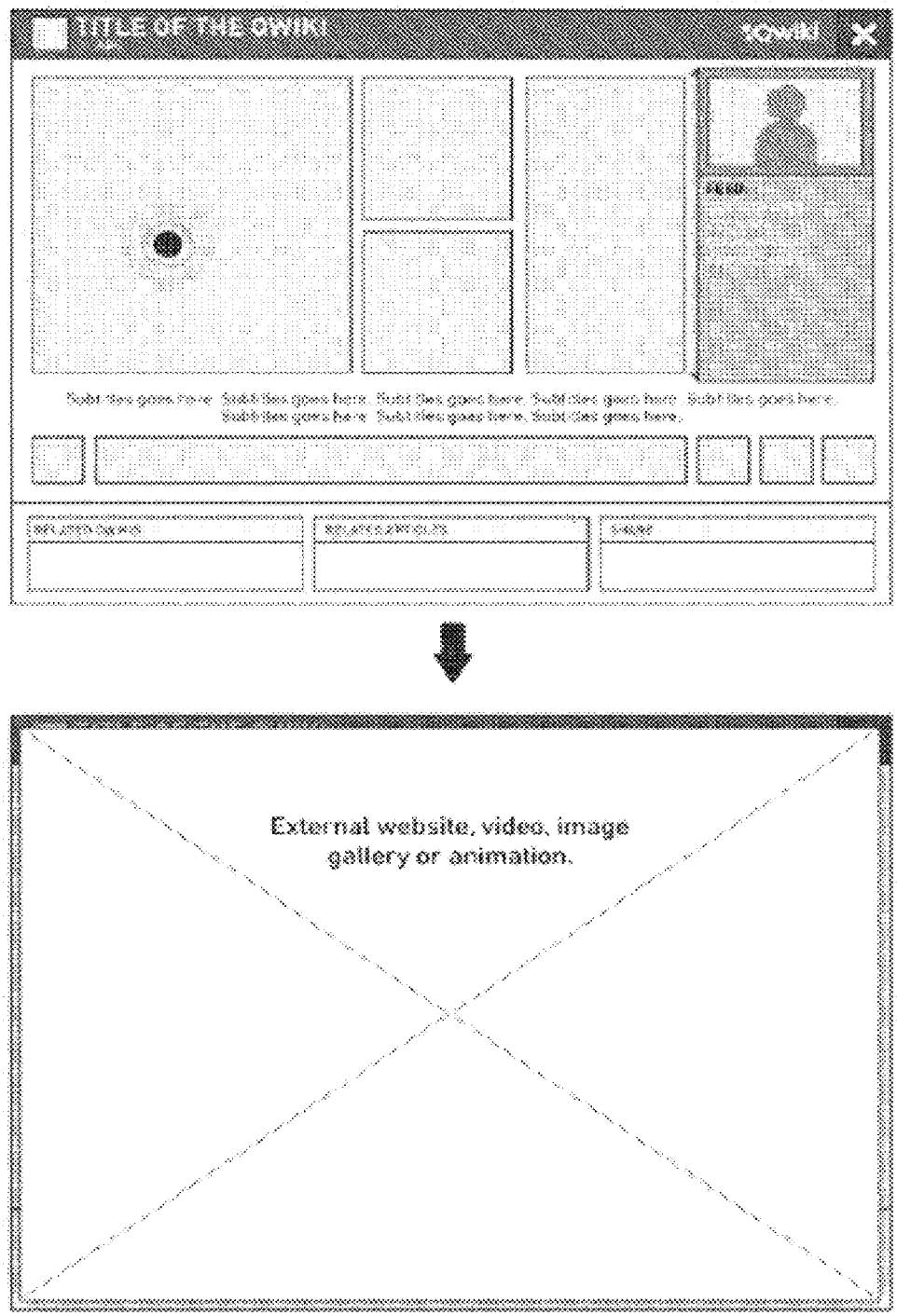
FIG. 18 is an illustration showing an example gesture consistent with certain aspects related to the innovations herein.

FIG. 18 shows an example Gesture consistent with aspects of the innovations herein. Here, within a search result expanded to the selected mixed-media module, systems and methods herein may be configured to respond to a user tap or click of an object in the grid or in the feed to open another mixed-media module, webpage, video, or detailed animation in an overlay over the current screen. Thus, some embodiments include methods wherein the interaction includes a tap of a portion, button or link of the selected multimedia presentation used in the generation of the new search results page.

Figure 19:
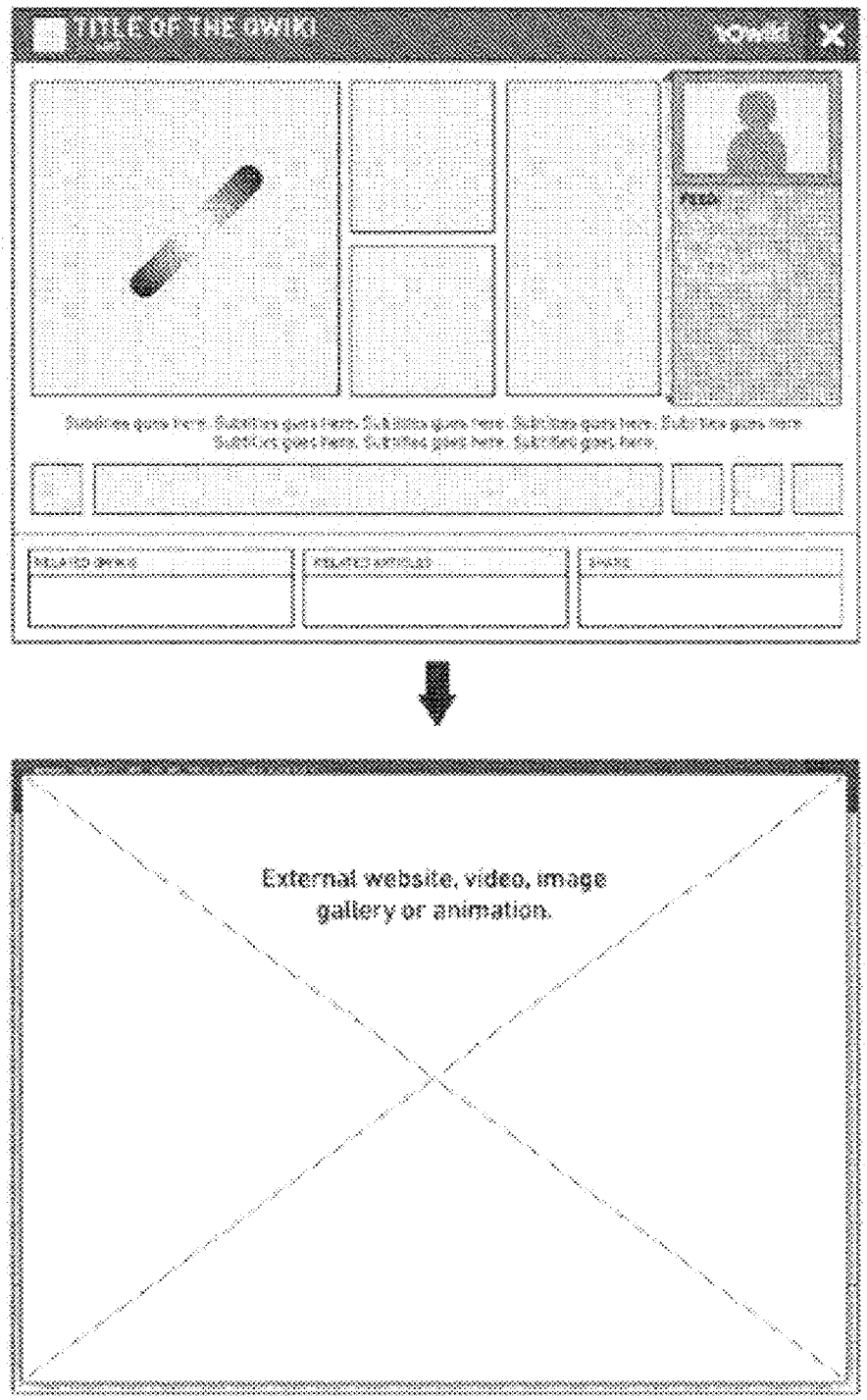
FIG. 19 is an illustration showing an example gesture consistent with certain aspects related to the innovations herein.

FIG. 19 shows another example Gesture consistent with aspects of the innovations herein. Here, a user can pinch into an object in the grid to see detailed or related information on the object including source, related media, access interactive animations, view full video, read full article, and the like. Thus, some embodiments include methods wherein interactions include a pinch of a portion, button or link of the selected multimedia presentation used in the generation of the new search results page.

Figure 20:
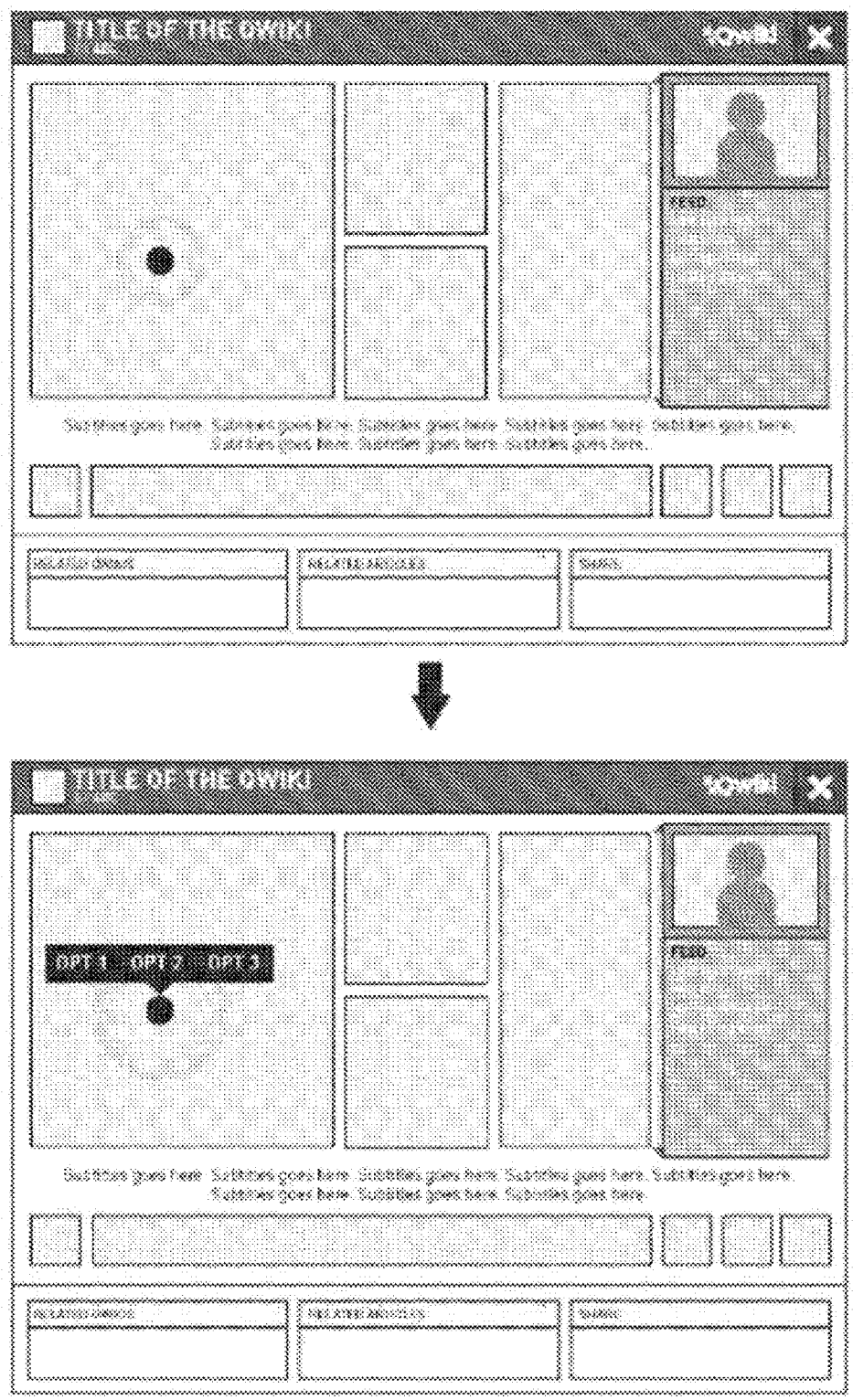
FIG. 20 is an illustration showing an example gesture consistent with certain aspects related to the innovations herein.

FIG. 20 shows another example Gesture consistent with aspects of the innovations herein. Here, for example, systems and methods herein may be configured such that a user can tap or click and hold on an element in the grid or in the feed to provide various or additional options. Such options may include, though are not limited to, open now, queue for later, add to favorites, etc. Thus, some embodiments include methods wherein interactions include a tap and hold of a portion, button or link of the selected multimedia presentation used in the generation of the new search results page.

Figure 21:
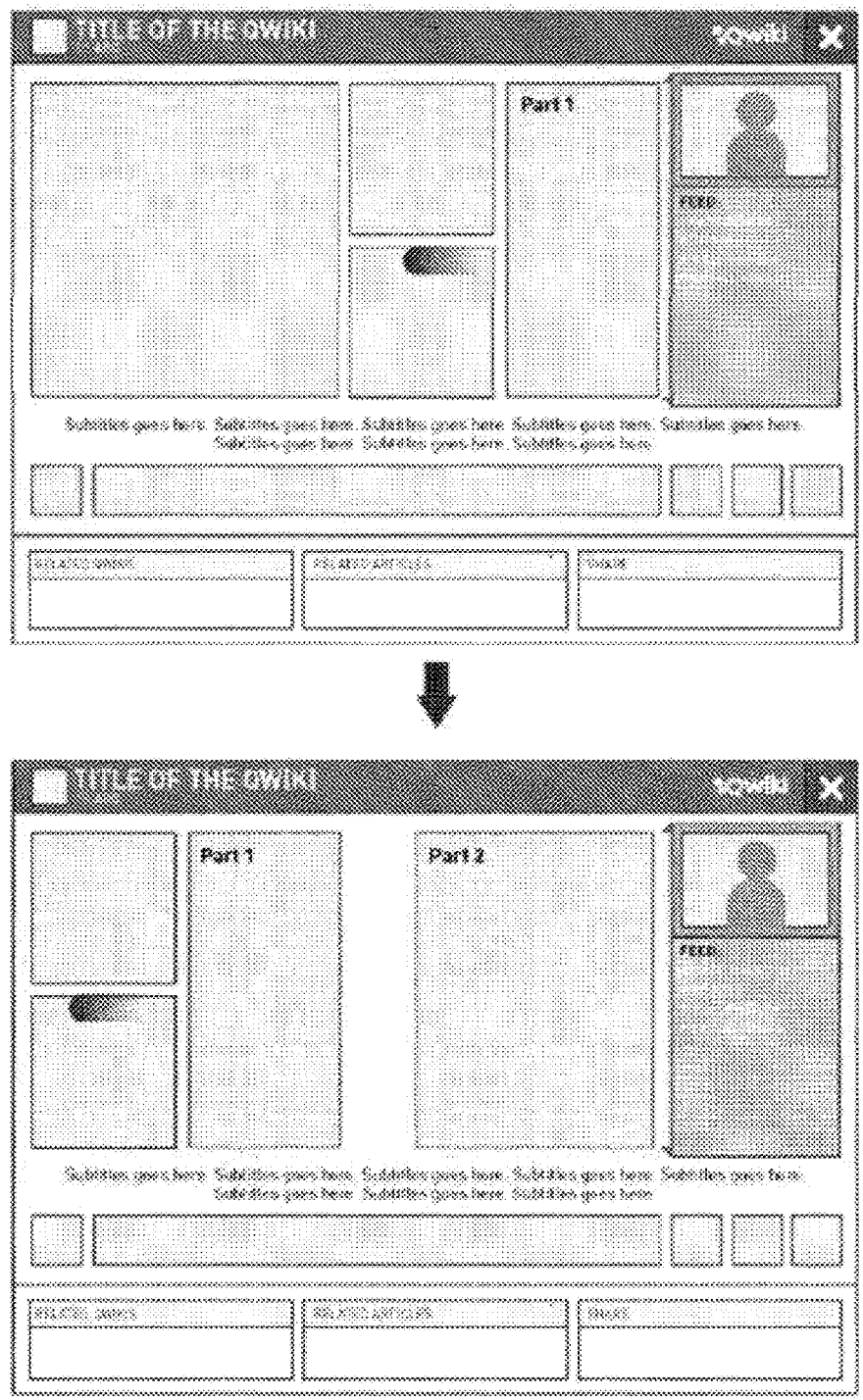
FIG. 21 is an illustration showing an example gesture consistent with certain aspects related to the innovations herein.

FIG. 21 shows another example Gesture consistent with aspects of the innovations herein. Here, a user can swipe or scroll with one finger left or right over the grid to advance or rewind the presentation of the mixed-media. Thus, some embodiments include methods wherein interactions include a swipe or scroll of a portion, button or link of the selected multimedia presentation used in the generation of the new search results page.

Figure 22:
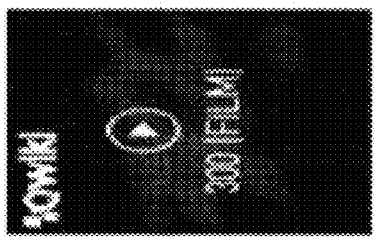
FIG. 22 is an illustration of an exemplary search engine results page showing integration/position aspects consistent with certain aspects related to the innovations herein.

FIG. 22 shows another example of an illustrative interface involving a sample search result and mixed-media module presentation, consistent with aspects of the innovations herein. Here, for example, the mixed-media module may be presented as a very foremost piece of content, such as the first item to select in the upper, left portion of the search result. Such placement yields easy user access to greater content in the mixed-media module, and all of the associated benefits therein to the search engine/provider and ad revenue partners.

In the description here, it is to be understood that both mouse/cursor enabled computing devices, and those without cursors, but use touch screen technologies are both fully supported. To that, the terms "click" or "tap" or "touch" can be used synonymously and interchangeably. Thus, a click-through is the same as a tap-through or any other term with the equivalent meaning. The mobile wireless devices can be touch screen enabled, using a stylus or finger or other such thing to interact with the screen, and objects on the screen. The touch screen enabled technologies also allow for pinching in or out to zoom in or out or enlarge or shrink an object or the display. Sliding a touch can scroll either in vertical or horizontal directions, or any other direction supported by the system. The touch screens can also detect a prolonged tap, opening further functionality when a prolonged tap and hold occurs on an object. In devices that do not support a touch screen, such functionality can be accomplished by a cursor or pointer of some sort, typically controlled by a mouse, pointer stick, roller ball, etc. There may be additional functionality embedded into the display objects to allow for some of the functionality such as a scroll bar or zoom buttons, etc. These functionalities are also fully supported here and can be used interchangeably with the touch screen enabled technologies.

In the present description, the terms component, module, device, etc. may refer to any type of logical or functional process or blocks that may be implemented in a variety of ways. For example, the functions of various blocks can be combined with one another into any other number of modules. Each module can be implemented as a software program stored on a tangible memory (e.g., random access memory, read only memory, CD-ROM memory, hard disk drive) within or associated with the computing elements, sensors, receivers, etc. disclosed above, e.g., to be read by a processing unit to implement the functions of the innovations herein. Or, the modules can comprise programming instructions transmitted to a general purpose computer or to processing hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, implementations and features of the invention may be implemented through computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe components such as software, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the location estimate features, may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied to include, but are not limited to, non-volatile storage media in various forms (e.g., optical, magnetic or semiconductor storage media), though do not include non-tangible media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Other implementations of the invention will be apparent to those skilled in the art from consideration of the specification and practice of the invention disclosed herein. It is intended that the specification and examples be considered as exemplary only, with a true scope and spirit of the invention being indicated by the disclosure above in combination with the following paragraphs describing the scope of one or more implementations of the following invention

The invention claimed is:

1. A method comprising:
   generating, by a processor, a search results page including search results to a user in response to a first search query, the generating the search results page comprising inserting an interactive multimedia presentation, the interactive multimedia presentation supplemental to an initial search results page and comprising a plurality of video, text, or image content items related to the first search query and separate from the content of the initial search results page;
   providing, by the processor for display via the search results page, the interactive multimedia presentation;
   providing, by the processor as a function of a first interaction of the user with the interactive multimedia presentation, user access to content selected from a group of content types consisting of third-party information, web sites, content, applications, and other multimedia, the access to content provided without navigating away from the search results page; and
   providing, by the processor as a function of a second interaction of the user with the interactive multimedia presentation, functionality configured to receive a new search query via a search box embedded within the interactive multimedia presentation and update the interactive multimedia presentation based on results responsive to the new search query, wherein the new search query is generated based on a selection by the user of one of the video, text, or images present in the interactive multimedia presentation.

2. The method of claim 1, wherein the processor is configured to process, as the second interaction, receipt of a gesture by the user on a mobile device.

3. The method of claim 2, wherein the gesture comprises a tap of a portion, button, or link of the interactive multimedia presentation.

4. The method of claim 2, wherein the gesture comprises a swipe or scroll of a portion, button or link of the interactive multimedia presentation.

5. The method of claim 1, wherein the search results comprise advertisements provided as a function of the user's first interaction with the interactive multimedia presentation.

6. The method of claim 1, wherein the search results comprise advertisements provided as a function of the user's second interaction with the interactive multimedia presentation.

7. The method of claim 1, wherein the providing of the interactive multimedia presentation for display via the search results page further comprises providing, by the processor, the interactive multimedia presentation for display in the search results page in an expanded view.

8. The method of claim 1, wherein the interactive multimedia presentation is a narrative multimedia presentation.

9. The method of claim 1, wherein the interactive multimedia presentation comprises at least one of text, animation, images, and video objects found in the search results.

10. A computing device comprising:
   a processor;
   a storage medium for tangibly storing thereon program logic for execution by the processor, the program logic comprising:
      generating logic executed by the processor for generating a search results page including search results to a user in response to a first search query, the generating the search results page comprising inserting an interactive multimedia presentation, the interactive multimedia presentation supplemental to an initial search results page and comprising a plurality of video, text, or image content items related to the first search query and separate from the content of the initial search results page;

first providing logic executed by the processor for providing for display via the search results page, the interactive multimedia presentation;

second providing logic executed by the processor for providing as a function of a first interaction of the user with the interactive multimedia presentation, user access to content selected from a group of content types consisting of third party information, web sites, content, applications, and other multimedia, the access to content provided without navigating away from the search results page; and third providing logic executed by the processor for providing as a function of a second interaction of the user with the interactive multimedia presentation, functionality configured to receive a new search query via a search box embedded within the interactive multimedia presentation and update the multimedia presentation based on results responsive to the new search query, wherein the new search query is generated based on a selection by the user of one of the video, text, or images present in the interactive multimedia presentation.

11. The computing device of claim 10, further comprising gesture processing logic executed by the processor for processing, as the second interaction, receipt of a gesture by the user on a mobile device.

12. The computing device of claim 10, wherein the gesture comprises a swipe or scroll of a portion, button or link of the interactive multimedia presentation.

13. The computing device of claim 10, wherein the search results comprise advertisements provided as a function of the user's first interaction with the interactive multimedia presentation.

14. The computing device of claim 10, wherein the search results comprise advertisements provided as a function of the user's second interaction with the interactive multimedia presentation.

15. The computing device of claim 10, wherein the first providing logic for providing the interactive multimedia presentation for display via the search results page further comprises expanded view providing logic executed by the processor for providing the interactive multimedia presentation for display in the search results page in an expanded view.

16. The computing device of claim 10, wherein the interactive multimedia presentation is a narrative multimedia presentation.

17. The computing device of claim 10, wherein the interactive multimedia presentation comprises at least one of text, animation, images, and video objects found in the search results.

18. A non-transitory computer readable storage medium for tangibly storing computer program instructions capable of being executed by a computer processor, the computer program instructions defining the steps of:

generating, by the computer processor, a search results page including search results to a user in response to a first search query, the generating the search results page comprising inserting an interactive multimedia presentation, the interactive multimedia presentation supplemental to an initial search results page and comprising a plurality of video, text, or image content items related to the first search query and separate from the content of the initial search results page;

providing, by the computer processor for display via the search results page, the interactive multimedia presentation;

providing, by the computer processor as a function of a first interaction of the user with the interactive multimedia presentation, user access to content selected from a group of content types consisting of third party information, web sites, content, applications, and other multimedia, the access to content provided without navigating away from the search results page; and providing, by the computer processor as a function of a second interaction of the user with the interactive multimedia presentation, functionality configured to receive a new search query via a search box embedded within the interactive multimedia presentation and update the multimedia presentation based on results responsive to the new search query, wherein the new search query is generated based on a selection by the user of one of the video, text, or images present in the interactive multimedia presentation.

19. The non-transitory computer readable storage medium of claim 18, wherein the interactive multimedia presentation is a narrative multimedia presentation.

20. The non-transitory computer readable storage medium of claim 18, wherein the interactive multimedia presentation comprises at least one of text, animation, images, and video objects found in the search results.

\* \* \* \* \*